US011796972B2

(12) United States Patent
Hales

(10) Patent No.: US 11,796,972 B2
(45) Date of Patent: *Oct. 24, 2023

(54) ON-DEMAND PRODUCTION OF ELECTRONIC DEVICE ACCESSORIES

(71) Applicant: Zagg Inc, Midvale, UT (US)

(72) Inventor: Randall Hales, Draper, UT (US)

(73) Assignee: ZAGG Inc, Midvale, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/410,867

(22) Filed: Aug. 24, 2021

(65) Prior Publication Data

US 2021/0382446 A1    Dec. 9, 2021

Related U.S. Application Data

(63) Continuation of application No. 16/573,790, filed on Sep. 17, 2019, now Pat. No. 11,099,535, which is a
(Continued)

(51) Int. Cl.
*G06F 19/00* (2018.01)
*G05B 15/02* (2006.01)
*G05B 19/418* (2006.01)

(52) U.S. Cl.
CPC ....... *G05B 15/02* (2013.01); *G05B 19/41865* (2013.01); *G05B 2219/32022* (2013.01);
(Continued)

(58) Field of Classification Search
CPC .............. G05B 15/02; G05B 19/41865; G05B 2219/32022; G05B 2219/32035; G05B 2219/32036; Y02P 90/02; Y02P 90/20
See application file for complete search history.

(56) References Cited

U.S. PATENT DOCUMENTS 7,054,708 B1    5/2006 Aamodt et al.
7,417,747 B2    8/2008 Liu
(Continued)

FOREIGN PATENT DOCUMENTS

CN    202152116 U    2/2012
CN    102815081 A    12/2012
(Continued)

OTHER PUBLICATIONS

[Kosign 2011] Dreamjet Korea, 'Artist' makes the only smart phone case (Year: 2011).*
(Continued)

*Primary Examiner* — Zhipeng Wang
(74) *Attorney, Agent, or Firm* — DENTONS Durham Jones Pinegar

(57) ABSTRACT

An on-demand production system for accessories for use with electronic devices is configured to generate digital templates defining the design of the accessories and provide the digital templates to retail or other locations. The retail or other locations may receive access to the digital templates automatically and/or electronically within a week, a day, or even minutes, of the digital template being created. When a customer requests an accessory, the digital template may be accessed. Using an electronic production machine and a supply of stock material, the accessory can be cut, formed, printed, or otherwise produced based on instructions or designs of the digital template. The electronic production machine may automatically read the digital template to automate the production at a retail location. The electronic production machine may produce the accessory on-demand, and production of the accessory may be completed within two hours, or potentially within ten minutes, of a request.

20 Claims, 22 Drawing Sheets

Related U.S. Application Data continuation of application No. 13/741,331, filed on Jan. 14, 2013, now Pat. No. 10,416,621.

(60) Provisional application No. 61/586,128, filed on Jan. 13, 2012.

(52) U.S. Cl.
CPC ............. *G05B 2219/32035* (2013.01); *G05B 2219/32036* (2013.01); *Y02P 90/02* (2015.11)

(56) References Cited

U.S. PATENT DOCUMENTS

| | | | |
|---|---|---|---|
| 8,190,483 B2 | 5/2012 | Woycik et al. | |
| 10,416,621 B2 | 9/2019 | Hales | |
| 11,099,535 B2 | 8/2021 | Hales | |
| 2001/0000222 A1 | 4/2001 | Miyazaki et al. | |
| 2003/0090723 A1 | 5/2003 | Schmidt-Joos et al. | |
| 2003/0118229 A1 | 6/2003 | Andrews et al. | |
| 2003/0120936 A1* | 6/2003 | Farris ..................... | G06Q 20/04 713/189 |
| 2005/0119779 A1 | 6/2005 | Amico et al. | |
| 2007/0240548 A1 | 10/2007 | Pape | |
| 2008/0251575 A1 | 10/2008 | Bowling et al. | |
| 2008/0263467 A1 | 10/2008 | Wilkins | |
| 2008/0313552 A1* | 12/2008 | Buehler ............... | G06K 15/021 715/760 |
| 2009/0284761 A1* | 11/2009 | Shelton ................... | B26D 7/27 358/1.1 |
| 2011/0016025 A1 | 1/2011 | Gaisford | |
| 2011/0048256 A1* | 3/2011 | Atta ........................ | B44C 1/105 101/45 |
| 2011/0096341 A1* | 4/2011 | Jacob ..................... | G06Q 30/06 358/1.6 |
| 2011/0271062 A1 | 11/2011 | Chen | |
| 2011/0295764 A1 | 12/2011 | Cook et al. | |
| 2011/0321094 A1 | 12/2011 | Kuo | |
| 2013/0036018 A1 | 2/2013 | Dickerson | |

FOREIGN PATENT DOCUMENTS

| | | |
|---|---|---|
| EP | 0838768 A2 | 4/1998 |
| WO | 2008058092 A2 | 5/2008 |
| WO | 2008093332 A1 | 8/2008 |
| WO | 2008144839 A1 | 12/2008 |
| WO | 2012139573 A2 | 10/2012 |

OTHER PUBLICATIONS

MyScreen Protector, "Oct. 18, 2011 >> Our new offer," https://web.archive.org/web/20120214214821/http://myscreenprotector.com:80/?Ing=3&view=news (Oct. 18, 2011).
MyScreen Protector, "Manual/Hinweisen/Instrukcja," www.MyScreenProtector.com (Oct. 18, 2011).
MyScreen Protector, Packaging (Oct. 18, 2011).
MyScreen Protector, Product Information Card (Oct. 18, 2011).
MyScreen Protector, "Stylish Protection—Protective Foils" (Oct. 18, 2011).
MyScreen Protector, "System WWW Support—solution for downloading outlines via internet to facilitate the cutting of the universal film to the shape of device screen using the access codes included with the product packaging," www.myscreenprotector.com.
"Veröffentlichung eines Videos zu einem späteren Zeitpunkt planen" (explanation of YouTube publication date), support.google.com/youtube/answer/270709?h:=de.
"Witamy na www-support.com," https://web.archive.org/web/20110203030139/http:/www-support.cm/index.php?Ing=3 (Feb. 3, 2011).
YOW! studio, "YOW! Show Displayschutz—Schneideplotter, Adhäsionsfolie," YouTube, https://www.youtube.com/watch?v=mWhiVA_wVCQ (Nov. 27, 2006).
YOW! studio, "YOW! Show Displayschutz—Schneideplotter, Adhäsionsfolie," YouTube, https://www.youtube.com/watch?v=mWhiVA_wVCQ, 1 screenshot (Nov. 27, 2006).
YOW! studio, "YOW! Show Displayschutz—Schneideplotter, Adhäsionsfolie," YouTube, https://www.youtube.com/watch?v=mWhiVA_wVCQ, 22 screenshots (Nov. 27, 2006).
Canadian Intellectual Property Office, "Examiner's Requisition," Canadian Application No. 2844739, dated Feb. 8, 2017.
Canadian Intellectual Property Office, "Examiner's Requisition," Canadian Application No. 2844739, dated Apr. 5, 2018.
Canadian Intellectual Property Office, "Examiner's Requisition" Canadian Application No. 2844739, dated Jun. 8, 2015.
Canadian Intellectual Property Office, "Examiner's Requisition," Canadian Application No. 2844739, dated Apr. 8, 2016.
CorelDRAW-Graphics-Suite-X4, "User's Guide" (2008).
Email from Bernhard Schmidt, Jan. 21, 2021.
European Patent Office, "Extended European Search Report," European Application No. 13736168.9, dated Apr. 30, 2015.
European Patent Office, "Extended European Search Report," European Application No. 20163034.0, dated May 26, 2020.
European Patent Office, "Communication pursuant to Article 94(3) EPC," European Application No. 13736168.9, dated Apr. 12, 2018.
https://web.archive.Org/web/20111019163351/http://www.chinee.com/html/en/Mobile_Prink_operation/364.html, https://web.archive.Org/web/20111013185011/http://www.chinee.com/html/cn (2011).
Jang Yoo Hwa, "Dreamjet Korea, 'Artist' makes the only smart phone case," Avingnews.network (Nov. 17, 2011).
Lamel Invoice No. 98/HB/12/2009, Dec. 4, 2009.
Lamel Invoice No. 101/HB/12/2009, Dec. 14, 2009.
Lamel Corrected Invoice No. 08/2009, Dec. 21, 2009.
MyScreen Protector, "Manual" (in Polish), https://web.archive.org/web/20080711183255/http:l/myscreenprotector.com/instrukcja (Jul. 9, 2008).
MyScreen Protector, https://web.archive.org/web/20080714195727/http:/myscreenprotector.com/produkt (Jul. 9, 2008).
MyScreen Protector, "Instructions" (in Polish), https://web.archive.org/web/2008079013513/http:l/myscreenprotector.com:80/instrukcja (Jul. 9, 2008).
MyScreen Protector, https://web.archive.org/web/20080712045101/http://myscreenprotector.com/szablony (Jul. 12, 2008).
MyScreen Protector, https://web.archive.org/web/20101123122828/http:/www.myscreenprotector.com/index.php?Ing=3&view=product (Nov. 23, 2008).
Cabinet GUIU—JurisPatent, "Notice of opposition and grounds of opposition," European Patent No. 2729907, dated Feb. 5, 2021.
Lamel Technology Sp. Z.o.o., "Notice of opposition and grounds of opposition," European Patent No. 2729907, dated Aug. 4, 2020.
Hesstoska s.r.o., "Notice of opposition and grounds of opposition," European Patent No. 2729907, dated Feb. 5, 2021.
Cellularline S.p.A., "Notice of opposition and grounds of opposition," European Patent No. 2729907, dated Feb. 5, 2021.
Green MNKY GmbH, "Notice of opposition and grounds of opposition," European Patent No. 2729907, dated Feb. 5, 2021.
Photograph of Lamel Trade Fair Stand (Kiosk), CeBIT 2011, Hanover, Germany, Mar. 1, 2011.
Statistics for "YOW! Show Displayschutz—Schneideplotter Adhasionfolie" YouTube, https://www.youtube.com/watch?v=mWhiVA_wVCQ&feature=youtu.be.
USPTO as International Searching Authority, "International Search Report and Written Opinion," International Application No. PCT/US2013/021499, dated Mar. 29, 2013.
www.MyScreenProtector.com/index.php?ing-3&view=outline&product=92B, after accepting access code.
www.MyScreenProtector.com/index.php?ing-3&view=outline&product=92B, prior to accepting access code.
YOW! Onlineshop für Werbeteknik und Textilveredelung, https:///www.y-o-w.com/de/impressum/.
European Patent Office, "Communication pursuant to Article 94(3) EPC," European Application No. 20163034.0, dated Sep. 29, 2021.
European Patent Office, "Decision Revoking European Patent," European Application No. 13736168.9, dated Jun. 13, 2022.

* cited by examiner

Payment Information:

Date: 12/21/2012
Time: 14:36:34 MST

Name: Thomas B. Markem
Billing Address: 43 Western Ridge Road
　　　　　　　　Billings, MT 59101

Credit Card: VISA
Number: **  ** 2131
Exp. Date: 07/15

Status: Approved

Your Protective Cover Will Be Finished In:
1 Minute 10 Seconds

*Fig. 26*

ON-DEMAND PRODUCTION OF ELECTRONIC DEVICE ACCESSORIES

CROSS-REFERENCE TO RELATED APPLICATIONS

This application is a continuation of U.S. patent application Ser. No. 16/573,790, filed on Sep. 17, 2019 and titled ON-DEMAND PRODUCTION OF ELECTRONIC DEVICE ACCESSORIES, now U.S. Pat. No. 11,099,535, issued Aug. 24, 2021 ("the '790 Application"), which is a continuation of U.S. patent application Ser. No. 13/741,331, filed on Jan. 14, 2013 and titled ON-DEMAND PRODUCTION OF ELECTRONIC DEVICE ACCESSORIES, now U.S. Pat. No. 10,416,621, issued Sep. 17, 2019 ("the '331 Application"). The '331 Application includes a claim for priority under 35 U.S.C. § 119(e) to the Jan. 13, 2012 filing date of U.S. Provisional Patent Application No. 61/586,128, titled ON-DEMAND PRODUCTION OF PROTECTIVE FILM PRODUCTS ("the '128 Provisional Application"). The entire disclosures of the '790 Application, the '331 Application, and the '128 Provisional Application are hereby incorporated herein.

TECHNICAL FIELD

The present disclosure relates generally to electronic devices. More particularly, aspects of the present disclosure relate to producing accessories customized for an electronic device. Example embodiments of the present disclosure relate to cutting or otherwise forming a protective or decorative film having a shape configured to fit a desired object. More particularly still, some embodiments of the present disclosure relate to producing a protective or decorative film using a digital template and/or artwork supplied using an on-demand design system. The digital template and/or artwork may be provided using an electronic delivery system providing timely access to new digital templates and artwork as they become available.

BACKGROUND

Since the advent of mobile computing, electronic devices have become increasingly portable, easier to use, and affordable. As a result, the frequency with which electronic devices are used, and the circumstances and locations where used, are also ever-increasing. In fact, users of electronic devices often access such devices many times throughout a day and in multiple locations.

Increased use of electronic devices may also be related to the increases in the types of functions the devices are able to provide, as well as the ability of portable electronic devices to have increased capabilities. For instance, in the recent past electronic devices that are intended for portable use may have primarily included portable audio players (e.g., SONY WALKMAN, MP3 players, etc.), cellular phones, and laptops. Often, a single person may have had one of each type of electronic device because each had a largely dedicated function. Advances in technology have, however, now allowed processors, storage and memory devices, input/output devices and components, network communication devices, and other computing elements and systems to be smaller and more powerful. Consequently, electronic devices, including portable electronic devices, are themselves becoming increasingly smaller and convenient—often with little or no reduction in computing power or computing capabilities. Indeed, a single smartphone may now have capabilities comparable to a desktop or laptop computer of only a few years ago.

Increased computing power and capacity has also led to additional devices being produced. Currently, for instance, electronic devices may include categories of portable electronic devices such as smartphones, tablet or slate computing devices, e-readers, portable media players, digital cameras, net books, GPS devices, watches, calculators, and the like. Many of these electronic devices may also have overlapping capabilities. For instance, a smartphone, e-reader, tablet, net book, portable media player, etc. may have network capabilities to access the Internet. Such capabilities thus allow even a device dedicated to a primary purpose to have multiple functions that increase the frequency in using the device. With the increased use and portability of electronic devices, there is a growing interest in protecting these devices. This is particularly the case as the advances in technology have made some electronic devices, including portable electronic devices, very expensive, and users have an interest in protecting their investment.

Many accessories have been developed for use with electronic devices. Such accessories may provide any number of utilitarian or aesthetic functions. For instance, some accessories may provide decorative features. Other accessories may expand the capabilities or convenience of electronic devices, while still other accessories may protect electronic devices from damage.

As examples of protective accessories, covers and cases have been developed to enclose parts of a device—and to remain on the device while in use—in order to protect the electronic device from damage. In addition to protecting the electronic device, some cases may also provide a desired aesthetic effect. More recently, thin films have been developed and used to protect or decorate one or more surfaces of an electronic device without adding much bulk to the electronic device. Widespread use of these thin films is particularly common among electronic devices having touch-sensitive screens and input devices, although thin films or other accessories are also useful in protecting other surfaces or components of an electronic device. The other surfaces or components may be protected by a thin film that is transparent, or which has some desired graphical or visual characteristics.

Users of electronic devices with thin films applied thereto, whether for protective, decorative, or other purposes, want a film that is not only thin and which minimizes any negative impact on use of the electronic device, but which does not peel off or create unsightly ridges, bumps, dimples, creases, or other features. To avoid these cosmetic issues, thin films may be cut-to-size so as to conform specifically to the shape and size of a particular electronic device. Generally, two options have been available to make custom, cut-to-size protective films. One option is to provide small sheets of thin film material that can be manually trimmed to conform to the size and shape of the electronic device. This process may be time and labor intensive, particularly for thin films that have surfaces with adhesives on them. Additionally, even small errors may result in a thin film lacking a proper fit and, thus, are undesirable for cosmetic and potentially functional reasons.

Another option has been for companies specializing in protective films to design cutting dies for use in cutting a material (e.g., a thin film) into a shape specific for use with a particular electronic device. The cutting dies may be used many times to produce large quantities of accessories specific to the size, shape, and configuration of the cutting die used during production. One or more different styles of accessories may be associated with a particular electronic device, depending on the type of accessory desired. Further, even accessories of the same general type (e.g., thin films for use in protecting or decorating an electronic device) may have different types, and a cutting die may need to be produced for that specific type of accessory. As an example, a thin film for protecting an electronic device may provide protection for a single surface, such as a display. An alternative accessory may provide added protection for other surfaces, including side and rear surfaces. Each cutting die may therefore be associated with a particular accessory having its own SKU or identification number, and those accessories can then be produced, packaged, and sold directly to consumers, or to wholesalers, retailers, or others who may distribute the products to the end consumer.

Increasingly, manufacturers of electronic devices are keeping the electronic devices, and the specific designs and form factors thereof, unavailable until the date they are publicly released. Once a device is being sold, a manufacturer of electronic device accessories can obtain the electronic device and use the electronic device to design and produce a cutting die, stamp, or other physical tool for production of an accessory fitted or otherwise specifically designed for the newly released electronic device. However, due to ramping-up manufacturing (e.g., production of the cutting dies), shipping, and other delays, it may be a week or more after an electronic device is released before the accessories specific to that electronic device are available to consumers. In that time, a user may have already damaged his or her electronic device or purchased a competitive product that was made available more quickly.

Additionally, because of the desire to make accessories available quickly, large quantities of each accessory may be produced. If an electronic device is unpopular or ends up having a short life cycle, the manufacturer or a distributor of the accessories may end up with excess supply of accessories that may ultimately end up being thrown out. Often, distributors may also look to the manufacturer to buy back excess supply, further increasing the cost to manufacturers who may also have their own excess supply. Further, because of the vast number of different electronic devices and available accessories, retailers, and particularly small retailers, have difficulty finding sufficient retail space to have a suitable quantity of accessories available for all electronic devices, and may not be able to stock accessories for all electronic devices, or for all electronic devices of a particular type (e.g., smartphones, tablet computing devices, etc.). Retailers may then dedicate the bulk of retail space to accessories for the top ten or fifteen electronic devices. Accessories for other electronic devices may have to be ordered, or, where possible, a retailer may manually cut the desired accessory (e.g., a thin film into a decorative or protective film). Accordingly, manufacturers and distributors alike are challenged to make available accessories customized for a wide variety of products, while also keeping enough supply on hand to satisfy customers and minimize losses from excess purchases.

SUMMARY

An on-demand production system for protective or decorative film products, and for other accessories for electronic devices, is configured to generate digital templates for the accessories and provide the digital templates to retail or other locations. The retail or other locations may receive access to the digital templates automatically and/or electronically within a week, a day, or even minutes, of creation of the digital template. When a customer wants to purchase an accessory, the digital template may be accessed. Using an electronic production machine and a supply of stock material available at the retail or other location, the accessory can be produced based on instructions or designs of the digital template. The electronic production machine may automatically read the digital template to automate the production at a retail or other location. When an electronic device is newly released, supply of a digital template in a timely manner may allow production of a corresponding accessory almost immediately, and without delays customarily associated with waiting for cutting dies to be designed and produced, use of the cutting dies or other manufacturing tools to produce the accessories, or shipment of accessories from one location to another.

In accordance with one embodiment of the present disclosure, a provider system may be provided and may be used to create a digital template for a protective film or other type of electronic device accessory. The provider system may make the digital template available to a retail location or other recipient location. Such availability may be effected by pushing a copy of the digital template to the recipient. Such a copy may be provided by electronic communication (e.g., over an electronic communication network) or by providing physical computer-readable media having the digital template stored thereon. Alternatively, a copy of the digital template may be stored and accessible via a computing application that is already accessible to the recipient location so as to allow immediate, or near immediate, access upon creation of the digital template. In accordance with at least one embodiment, a retail location or other recipient location may use a personal, portable, high-speed, or other electronic production machine to produce the accessory based on a digital template. Where the electronic production machine is a cutting machine, it may include a cutting tool for cutting stock supplies of blank film materials into shapes and designs as defined by one or more digital templates. Such a cutting tool may include a programmable cutter that may be electronically controlled to cut various shapes or other designs.

The film materials that are cut may be transparent or opaque. Optionally, the film materials are flexible, or include one or more flexible layers. In one embodiment, a transparent film material includes a substantially transparent polymeric protective layer, such a layer being optionally flexible. Non-essential additional layers may include an adhesive layer and a removable backing layer, any or all of which may be flexible. In at least one embodiment, the electronic production machine is enabled for network communication. Such an electronic production machine may receive digital templates pushed by, or requested from, the provider system, browse digital templates stored locally or by a server or provider system, or otherwise access digital templates for use in producing an accessory such as a protective film.

In one embodiment, a method for providing a retail location with on-demand and near real-time access to digital templates for electronic device accessories includes creating a digital template defining an accessory configured for use with a particular electronic device. The digital template may be stored as computer-executable instructions on computer-readable media. The digital template may be sent or otherwise made available to retail or other recipients having an electronic production machine capable of forming the accessory in a shape defined by the digital template. The digital template may be used to produce any number of types of accessories, including protective films for application to one or more surfaces of the particular electronic device. Additional accessories include decorative films, bumpers, folios, keyboards, and the like.

In accordance with another embodiment of the present disclosure, a method for accessing a digital template for an accessory and creating the accessory on-demand includes receiving a digital template defining the accessory. The digital template, or instructions based thereon, may be transferred to an electronic production machine. The electronic production machine may cut or manipulate a stock supply of materials to form the accessory of a type, shape configuration, or other form defined by the digital template. Optionally, decorative embellishments may be printed, formed, or otherwise created using the electronic production machine. The type of device for which the accessory is intended may include portable electronic devices (e.g., cell phones, tablets, portable gaming systems, GPS devices, etc.), other consumer electronics, watches, cameras, or other products. Where an accessory comprises a protective film, the protective film may also be used on any suitable surface of the corresponding electronic device, including a display, a housing, a user interface, or other surface.

According to one or more embodiments of the present disclosure, a system for providing a retail location with on-demand and near real-time access to digital templates for producing accessories for electronic devices can include one or more computer-readable media having stored thereon at least one digital template including a design or instructions for an accessory corresponding to a particular model of an electronic device. A computing component optionally includes or can access one or more computing applications usable for creating the digital template and storing the digital template on the one or more computer-readable media. A computing component may also be adapted to electronically transfer a digital template, or instructions based thereon, to a recipient location having an electronic production machine capable of forming or otherwise producing the protective film or other accessory in a shape or design defined by the digital template. In some embodiments, the electronic production machine may be included as part of a kiosk, and potentially a self-serve kiosk.

In another embodiment, a system for creating on-demand protective films includes an electronic production machine capable of creating an accessory in a form defined by a digital template. At least one computing component may be included and configured to receive the digital template defining the accessory's form, or instructions corresponding to the digital template, from a provider computing system. A computing component may also be enabled to transfer the digital template, or instructions corresponding to the digital template, to the electronic production machine. The electronic production machine and/or a recipient location may be remote relative to a provider system. Optionally the recipient location is connected to the provider system using an electronic communication network. In at least one embodiment, the electronic production machine is enabled for network communication to communicate over a network with the provider system—even potentially in the absence of a separate, local computing device or system. The recipient location may include a storefront, a kiosk, or a self-serve kiosk in some embodiments. A recipient location may also correspond to a retail location selling products branded or developed by the provider.

According to one or more other embodiments, an electronic production machine may be provided for, and can include, a housing, one or more production elements linked to the housing, and a feed system capable of feeding a supply of stock protective film materials through at least a portion of the housing and to the one or more production elements. A processing component of the electronic production machine may receive one or more digital templates directly or indirectly from a provider system and then use the one or more digital templates to cause the one or more production elements (e.g., cutting elements) to produce an accessory (e.g., a protective film) having a size, shape, or other configuration for use with an electronic device. The accessory may be customized for a particular model of electronic device. Optionally, the electronic production machine may be portable, part of a kiosk, or combine multiple types of production components (e.g., cutting elements, printing elements, embossing elements, etc.).

Other aspects, as well as the features and advantages of various aspects, of the present disclosure will become apparent to those of ordinary skill in the art through consideration of the ensuing description, the accompanying drawings, and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 11 is an example graphical user interface usable in the methods of FIGS. 6-8 to select a digital template corresponding to an accessory of an electronic device, based on a manufacturer or carrier of the electronic device;

FIG. 12 is an example graphical user interface usable in the methods of FIGS. 6-8 to select a digital template based on a SKU for the accessory to be produced;

FIGS. 22-26 illustrate example user interfaces that may be used in connection with a system for producing and/or providing accessories for electronic devices, in accordance with one embodiment of the present disclosure.

DETAILED DESCRIPTION

Figure 1:
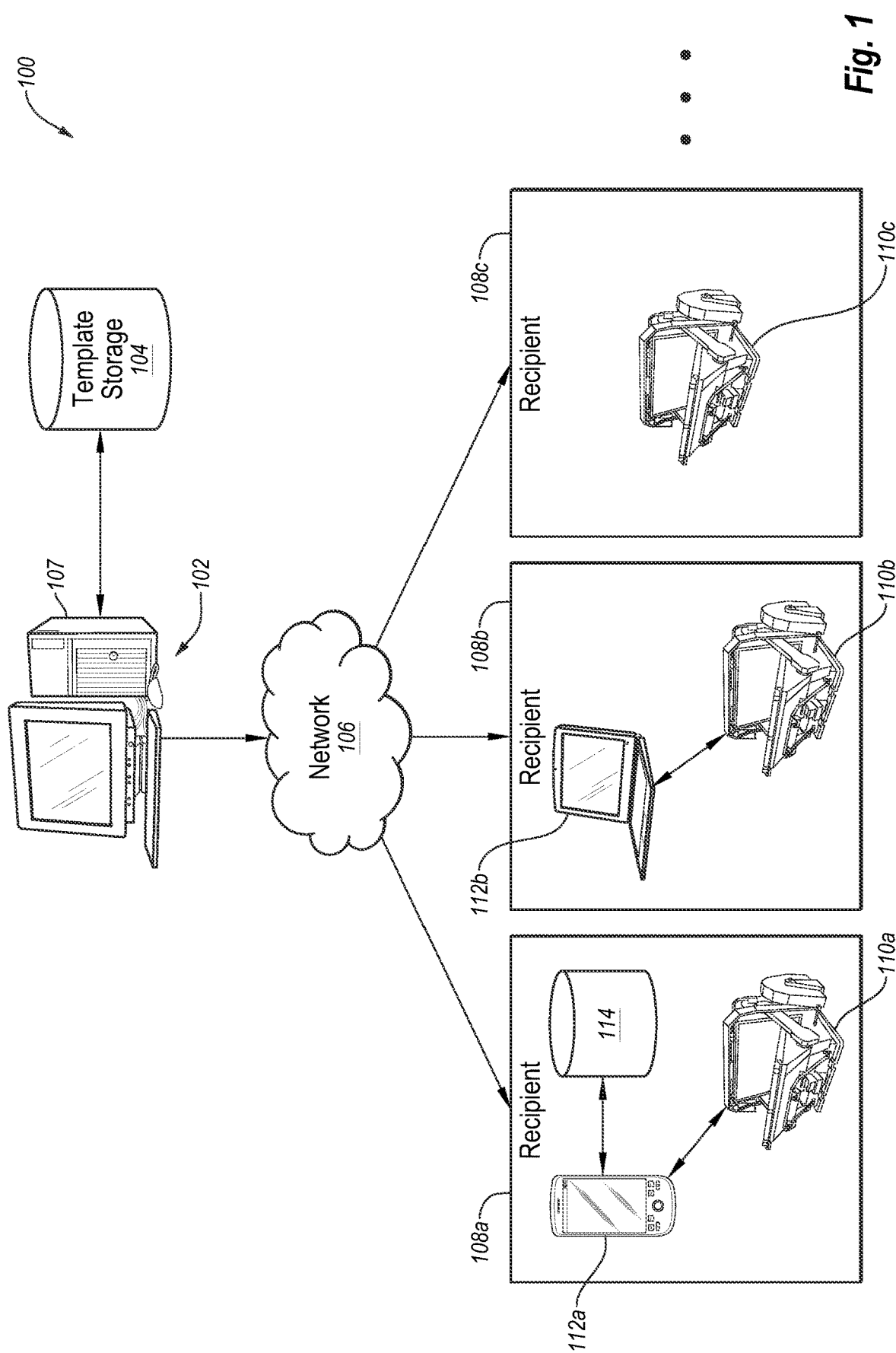
FIG. 1 is a schematic illustration of an example system for distributing digital templates for use in producing accessories usable with electronic devices, according to one example embodiment of the present disclosure.

Systems, devices, and methods according to the present disclosure are configured for use in producing accessories usable in connection with electronic devices. Without limiting the scope of the present disclosure, accessories for electronic devices may include protective films to protect one or more surfaces of an electronic device, or decorative skins or films for providing aesthetic or decorative embellishments to one or more surfaces of an electronic device. An accessory may include a film providing both protective and aesthetic functions. Still other examples of accessories may satisfy protective, decorative, or functional purposes. Examples of additional accessories producible in accordance with embodiments of the present disclosure include bumpers, cases, folios, keyboards, speakers, and the like.

Accessories may be used in connection with numerous types of electronic devices, including mobile phones, so-called "smartphones," hand-held multimedia devices (e.g., IPOD® branded devices available from Apple, Inc.), slate or tablet computers, e-readers, cameras, gaming devices, GPS systems, laptops, PDAs, monitors, televisions, home entertainment systems, watches, other devices, or any combination of the foregoing. Moreover, protective films, or other accessories, produced, supplied, or created according using the systems, devices, or methods herein, or learned upon a review hereof, may be used with electronic devices that are portable or non-portable in nature. Further, while the disclosure relates to use of the disclosed methods, systems, and devices primarily with electronic devices, other embodiments may be used in connection with non-electronic devices (e.g., a display cabinet).

As used herein, a so-called "digital template" may be used in the production of any number of different types of products or accessories. For instance, a digital template may include the design for a protective film to cover all or a portion of a surface of an electronic device, or to cover all or portions of multiple surfaces of electronic devices or any other device or substrate. A digital template may also include design elements specifying the size, shape, or configuration of an accessory, artwork or other decorative effects, other elements that may be used for protective, aesthetic, functional, or other purposes, or any combination of the foregoing. The term "digital template" should therefore be broadly construed to include information used in the production of an accessory using an electronic production machine, and should also be interpreted to include instructions derived from the digital template, regardless of the form in which the instructions are stored or used.

In accordance with one embodiment of the present disclosure, on-demand distribution and/or production systems are provided for allowing one entity to create a digital template for an accessory for an electronic device and to distribute the digital template to another entity for on-demand production of the accessory. In general, the entity creating the digital template, or making a digital template available, is referred to herein as a "provider," while the entity receiving the digital template and/or creating the accessory using the digital template is referred to herein as a "recipient". Such terminology is merely used to simplify the discussion herein and is not intended to limit the disclosure herein in any manner. Indeed, a single entity may act as both a provider and recipient, there may be multiple providers or recipients, or there may be one or more entities acting as intermediaries between the so-called provider and recipient.

Example embodiments of the present disclosure may thus be directed to systems, methods, and devices for creating and/or distributing accessories for electronic devices. More particularly, exemplary embodiments of the present disclosure may be directed to systems, machines, assemblies, and computer-readable media usable to efficiently, and potentially automatically, obtain digital templates usable in the on-demand production of accessories for a wide variety of substrates. In general, a "substrate" includes any electronic device or other device or item for which an accessory defined by a digital template is specifically designed for use. Accordingly, example embodiments of the present disclosure may be utilized to efficiently produce accessories on-demand, and potentially without delays that may generally be associated with manufacturing and shipping particular accessories or the demands of manually cutting or forming a material to fit a substrate (e.g., a particular model of an electronic device). For instance, an accessory such as a protective film may be produced using an electronic production machine that receives a digital template. The electronic production machine, which is optionally programmable, may build or receive cutting or other instructions corresponding to the digital template through use of an on-demand distribution system. The on-demand distribution system may push the digital templates to the recipient who produces, sells, or otherwise distributes an accessory. In other embodiments, a digital template may be provided upon request, or the digital template may be supplied to cloud-based storage and a software-as-a-service system may be used to access the digital template. The digital template may also be supplied to a self-service kiosk or other location where a consumer may directly interact with the production and/or distribution system. Accessories producible on-demand using the distribution system may include protective and/or decorative films, as well as other accessories (e.g., bumpers, cases, keyboards, speakers, stickers, etc.).

Any of such systems, machines, assemblies, methods, or the like may be used to reduce delays associated with obtaining a desired accessory for a portable electronic device, and also enhance the ability to customize a product. Such systems, machines, assemblies, methods, and the like may also be used to reduce the likelihood of a protective film or other accessory being manually cut incorrectly and/or the delays associated with manually producing a protective film or other accessory. Through the use of example on-demand systems, machines, assemblies, and methods, costs may also be reduced through the reduction of consumption of production materials or supplies, packaging and handling costs excess inventory costs, or display and storage costs.

Turning now to FIG. 1, an example system is shown and includes an on-demand distribution system 100 for distributing a digital template for use in producing an accessory for a portable electronic device to one or more recipients. For convenience, the digital template may be referred to as being used to produce a protective film; however, it should be appreciated by a person of ordinary skill in the art, in view of the disclosure herein, that the digital template may also be used for decorative or other accessories, or for combinations of protective, decorative, or other types of accessories.

In accordance with some embodiments of the present disclosure, a recipient optionally has production capabilities to receive a digital template and use the digital template to produce a protective film using the digital template. As discussed in greater detail herein, the digital template may be provided in electronic form, as instructions that may be provided to an electronic production machine that can use stock protective film or other materials and cut, stamp, or otherwise manipulate such materials to produce the desired shape or other features of the accessory.

As shown in FIG. 1, the on-demand distribution system 100 may include a provider system 102 that communicates with or otherwise provides digital templates to one or more recipients 108*a*-108*c* over a network 106. The provider system 102 may take a number of different forms. In FIG. 1, for instance the provider system 102 is shown as include a desktop computing device 107. In other embodiments, the provider system 102 may include a computing device of another form (e.g., laptop, tablet, PDA, smartphone, server, etc.). The provider system 102 may also include multiple computing devices of the same or diverse types. Where multiple devices are included, such devices may operate in concert or be independent to produce any particular one or more digital templates for an accessory for an electronic device.

In accordance with one example embodiment, the provider system 102 may be usable in the creation of a digital template for a protective film or other accessory. For instance, when an accessory and/or device is identified, an operator of the provider system 102 may use a design program installed on the provider system 102 to define the size, shape, cutouts, position, artwork, artwork locations, material, and other features of a digital template that may be used to define a particular accessory. Multiple different digital templates may also be produced for the same electronic device and/or for different products. For instance, in connection with a particular smartphone, the provider system 102 may be used to develop a first digital template that corresponds to a protective film for covering only a front side (or portion of a front side) of the smartphone. A second digital template may be defined using the provider system 102 to correspond to a protective film for covering only a rear side (or portion of a rear side) of the same smartphone. A third digital template may be defined using the provider system 102 to correspond to a protective film for covering multiple surfaces of the smartphone, and potentially for full body protection. A fourth digital template may be defined using the provider system 102 to correspond to a protective film for some other protection, for a decorative product, or for some other type of accessory, or some combination thereof. For instance, full body protection may be provided in different manners (e.g., single piece construction, multiple piece construction), front or rear protection may vary (e.g., full surface protection, partial surface protection, display only protection, etc.), different materials may be used (e.g., transparent film for a display, opaque or decorated film for one or more other surfaces), or any number of other digital template designs may be created. Additionally, different electronic devices may have different form factors, so one digital template may correspond to a particular smartphone or other product, while a different electronic device may have a digital template created therefor, to correspond to an entirely different form, shape, structure, or the like. Accordingly, dozens, hundreds, or even thousands of different accessories may be designed, with each potentially having its own corresponding digital template for production.

The provider system 102 may include any number of different programs, applications, or the like for creating one or more digital templates. Such programs may generally include industrial design programs configured to create designs capable of being produced on electronic, mechanical, or other devices capable of producing corresponding protective films or other accessories. Different programs may be used, or a single program may also be used to produce designs and digital templates in one or more different formats. For instance, one electronic production machine may use production instructions in a first format, while a different electronic production machine may use production instructions in a different format to produce an accessory for an electronic device of the same shape, size, and configuration. In general, a single "digital template" corresponding to a particular accessory may be produced in a single format or in multiple different formats.

When a digital template is created, the digital template may be stored on suitable storage media. In FIG. 1, an example storage media may include a digital template storage 104, which may include a database storing one or more different digital templates, any or all of which may be stored in one or more different formats. Additionally, or alternatively, the digital template storage 104 may house additional information other than the digital templates. For instance, the digital template storage 104 may include a database of related information. Such related information may include descriptions of the devices for which each digital template is designed, identifications of the manufacturers of the devices corresponding to each protective film, SKU numbers for the accessories associated with the digital templates, indexing tables for searching the digital templates or the devices associated therewith, restrictions on what recipients can use certain digital templates, historical information about which digital templates have been provided to particular recipients or on production of particular accessories, artwork or other decorative information, other data or programs, or any combination of the forgoing.

The digital template storage 104 may be connected to the provider system 102 using two-way communication that allows digital templates stored at the digital template storage 104 to be written to, or read from, the digital template storage 104. The two-way communication is merely illustrative, however, and in other embodiments such communication may be varied. In other embodiments, for instance, the digital template storage 104 may be write-only or read-only storage relative to the provider system 102. In such an embodiment, a different system connected to the digital template storage 104 (e.g., directly or via the network 106) may write to, read from, or delete from the digital template storage 104. Further, while the two-way communication between the provider system 102 and the digital template storage 104 is shown as bypassing the network 106, in other embodiments the provider system 102 and the digital template storage 104 may be communicatively linked for one or two way communication via the network 106. In still other embodiments, the digital template storage 104 may be included as part of the provider system 102, without the use of separate or additional resources or components, or multiple different digital template storages 104 may be provided.

The on-demand distribution system 100 may be used as a "push" distribution system in some embodiments. In the context of a push distribution system, digital templates created or distributed by the provider system 102 may be sent or otherwise provided to one or more recipients 108a-108c even absent a request from the recipients 108a-108c to receive the digital templates. Such a system may be useful to allow the recipients 108a-108c to produce a corresponding accessory in a timely and efficient manner. For instance, in one embodiment, a model of a new portable electronic device may be unavailable until the day the portable electronic device is available to the public (or shortly therebefore). That same day, or shortly thereafter, a digital template corresponding to the new portable electronic device can be created at, or provided to, the provider system 102. Once the digital template is produced it may be pushed to the recipients 108a-108c in an electronic format usable by one or more electronic production machines 110a-110c of the recipients 108a-108c. One or more of the recipients 108a-108c may be retail establishments, self-serve kiosks, or other locations that sell accessories for electronic devices to consumers. When a customer enters a retail location, or accesses a self-serve kiosk following creation of a desired digital template, the recipients 108a-108c may have already received the digital template, even absent a particular request therefor. The recipient may have materials usable to produce the accessory. For instance, where an accessory is a protective film, rolls, sheets, or other forms of stock protective film—which is optionally sold or otherwise provided by the provider of the provider system 102—can be used by the electronic production machines 110a-110c to cut, stamp, print, form, or otherwise produce the corresponding accessory in real-time for the consumer. There may thus be little or no delay at the recipients 108a-108c, and no delay may be introduced as a result of shipping or delivery, or with added expense to expedite or ship and deliver the desired accessory.

The foregoing example is illustrative. For instance, in other embodiments a model for an electronic device may be available prior to the launch of the electronic device. One or more digital templates for accessories used in connection with an electronic device may also be produced prior to the launch date, but may then be pushed to the recipients 108a-108c on the day of the launch, or sometime before the launch. In still other embodiments, a digital template may be provided in a "pull" system in which the digital template is provided upon request. The on-demand distribution system 100 may also operate using any combination of "push" and "pull" based delivery models.

In the illustrated on-demand distribution system 100, the operation of the system may include the provider system 102 sending a created digital template to one or more of the recipients 108a-108c via the network 106. As discussed herein, a digital template may be encoded in a computer or machine-readable format that may be read by a computing device, electronic production machine 110a-110c (e.g., an electronic cutting machine, a printer, an additive manufacturing apparatus, etc.), or other device. In at least one embodiment, the network 106 may therefore be capable of carrying electronic communications. The Internet, local area networks, wide area networks, virtual private networks (VPNs), other communication networks or channels, or any combination of the forgoing may be represented by the network 106. In other embodiments, a digital template may be stored on computer-readable media and the media itself may be provided to the recipients 108a-108c. In such an embodiment, the network 106 may include a shipping or delivery network, such as the postal service, an overnight carrier, or the like. In some embodiments, some or all digital templates may be pre-loaded on an electronic production machine 110a-110c so that separate delivery of the digital template is not required.

Regardless of whether the network 106 includes a communication network or a shipping network of physical trucks, airplanes, trains, or the like, a digital template produced or distributed by the provider system 102 may be sent to the network 106. Using a suitable electronic or physical addressing scheme, the digital template may be delivered through the network to the recipients 108a-108c. In one embodiment, each recipient 108a-108c may have a network address associated with a corresponding computing device, and messages sent through the network 106 may be addressed to the network address.

Once the digital template is received by a recipient 108a-108c, the digital template may be handled in a number of different manners. For instance, as shown in FIG. 1, a first recipient 108a may have a computing device 112a that can communicate with a separate electronic production machine 110a. The computing device 112a may generally be capable of providing instructions to the electronic production machine 110a to direct operation of the electronic production machine 110a. In one embodiment, for instance, the directions provided by the computing device 112a may correspond to instructions or definitions stored in a digital template as received by, or accessible to, the recipient 108a.

Optionally, a digital template delivered to the recipient 108a may be stored at one or more storage devices, such as the database 114. Such storage devices may receive a digital template directly from the provider system 102, or from a computing device 112a or electronic production machine 110a. Thereafter, when the digital template is to be used for production of an accessory, the computing device 112a may request the digital template from a database 114 or other storage device and then transfer the digital template, or instructions corresponding thereto, to the electronic production machine 110a. In some cases, the computing device 112a may act as a relay for transferring instructions. In other embodiments, the computing device 112a may act as a translation service for translating instructions from a digital template into a format that can be used by the electronic production machine 110a. In another embodiment, a digital template may be received by the computing device 112a, and may be optionally stored at least temporarily thereon. The digital template may then be saved by the computing device 112a to the database 114 and retrieved on-demand.

The computing device 112a may take any suitable form. For instance, the illustrated computing device 112a may be a portable electronic device such as a PDA or smartphone capable of running one or more applications for communicating with the electronic production machine 110a and/or the database 114, and/or which may connect to the network 106 to receive digital templates, provide production history information, or to receive or send other information. In other embodiments, a laptop, tablet, or desktop computing device 107 may be used and/or the storage device represented by the database 114 may be incorporated within the computing device 112a. At recipient 108b, for instance, a computing device 112b is shown as a laptop computing device. The computing device 112b may have storage therein that retains one or more received digital templates, stores production history information, and the like. As a result, when an accessory is to be produced, the computing device 112b may access its internal persistent storage and retrieve a digital template, or retrieve instructions or an address for accessing a digital template, artwork, and the like. The digital template or instructions corresponding thereto may then be provided to the electronic production machine 110b for production of the protective film or other type of accessory.

In still another embodiment, a recipient may not use any additional electronic or computing device that communicates with the electronic production machine 110c. Recipient 108c, for instance, may include an electronic production machine 110c that is illustrated as a stand-alone electronic cutting machine, and which is enabled to communicate with the network 106 and/or to store or access digital templates. For instance, the electronic production machine 110c may have communication, interface, and programming capabilities thereon so as to allow a digital template to be received or accessed directly at the electronic production machine 110c. The digital template may then be accessed on demand and used to produce an accessory upon request.

The on-demand distribution system 100 may include other capabilities other than, or in addition to, those discussed herein. By way of example, in the illustrated embodiment, a push system is disclosed in which recipient-initiated communication may be used to push one or more digital templates from a provider system 102 to the recipients 108a-108c through the network 106. In other embodiments, digital template transfer may be initiated in other manners. For instance, a pull system may be used as discussed herein to allow a recipient 108a-108c to identify a desired digital template and request the digital template from the provider system 102. In some embodiments, the recipient 108a-108c may also have the ability to modify or delete digital templates. In another embodiment, one or two way communication may be used to allow the provider system 102 to access digital templates available to a particular recipient 108a-108c and modify the available digital templates to add, change, and/or remove digital templates. Removed digital templates may correspond to products that have been discontinued or products that are out of date. Digital templates may also be removed simply because an updated digital template is available. Digital templates may also be removed for any number of other reasons. As an example, a digital template may be provided with an expiration date, or digital templates not used for a certain period of time may be removed. If a recipient 108a-108c fails to provide payment, maintain a subscription, or otherwise pay for digital templates, access to certain digital templates may be restricted (e.g., by removing a digital template).

The provider system 102 optionally can communicate with any number of recipients 108a-108c, as shown by the ellipses. Such recipients 108a-108c may be of a number of different types. For instance, recipients 108a-108c may correspond to brick and mortar or kiosk retail locations that sell accessories to consumers, self-serve kiosks that include user interfaces for directly interfacing with a consumer, manufacturers who produce accessories and thereafter provide such accessories to retailers, direct consumers, or others or any combination of the forgoing. Such recipients may thus include customers of the provider, franchisees of the provider, clients of the provider, distributors of the provider, end-user consumers, or the like.

While an example embodiment may use direct addressing to deliver digital templates as discussed above, distribution of digital templates may also or alternatively occur using broadcast communication. For instance, the recipients 108a-108c may have devices that listen for broadcast data and retrieve the digital templates when broadcast. Using a public and/or private key available to the recipients 108a-108c, an encrypted digital template may then be decrypted and used. As still another alternative, addressing may be used to allow the provider system 102 to direct a digital template to less than all recipients 108a-108c. Thus, a product that may be limited to a particular area (e.g., a Europe-only model) or retailer may have a corresponding digital template sent to corresponding locations without sending the same digital template to other areas remote from the limited area of the product. Other reasons for limiting distribution may also be provided. For instance, some recipients 108a-108c may have exclusive or priority rights to receive digital templates earlier than other recipients, some recipients 108a-108c may have different subscription levels or branding for artwork, and the like.

As discussed herein, each of the provider system 102, network 106, electronic production machines 110a-110c, computing devices 112a, 112b, and digital template storage 104 or databases 114 may optionally be communicatively linked to one or more other components. The precise type of communication can be varied based on known, current or even to-be-developed technology. Such communication may make use of conductive wires, fiber optic cables, wireless communications, or other communication technology to establish or effect communication.

Figure 2:
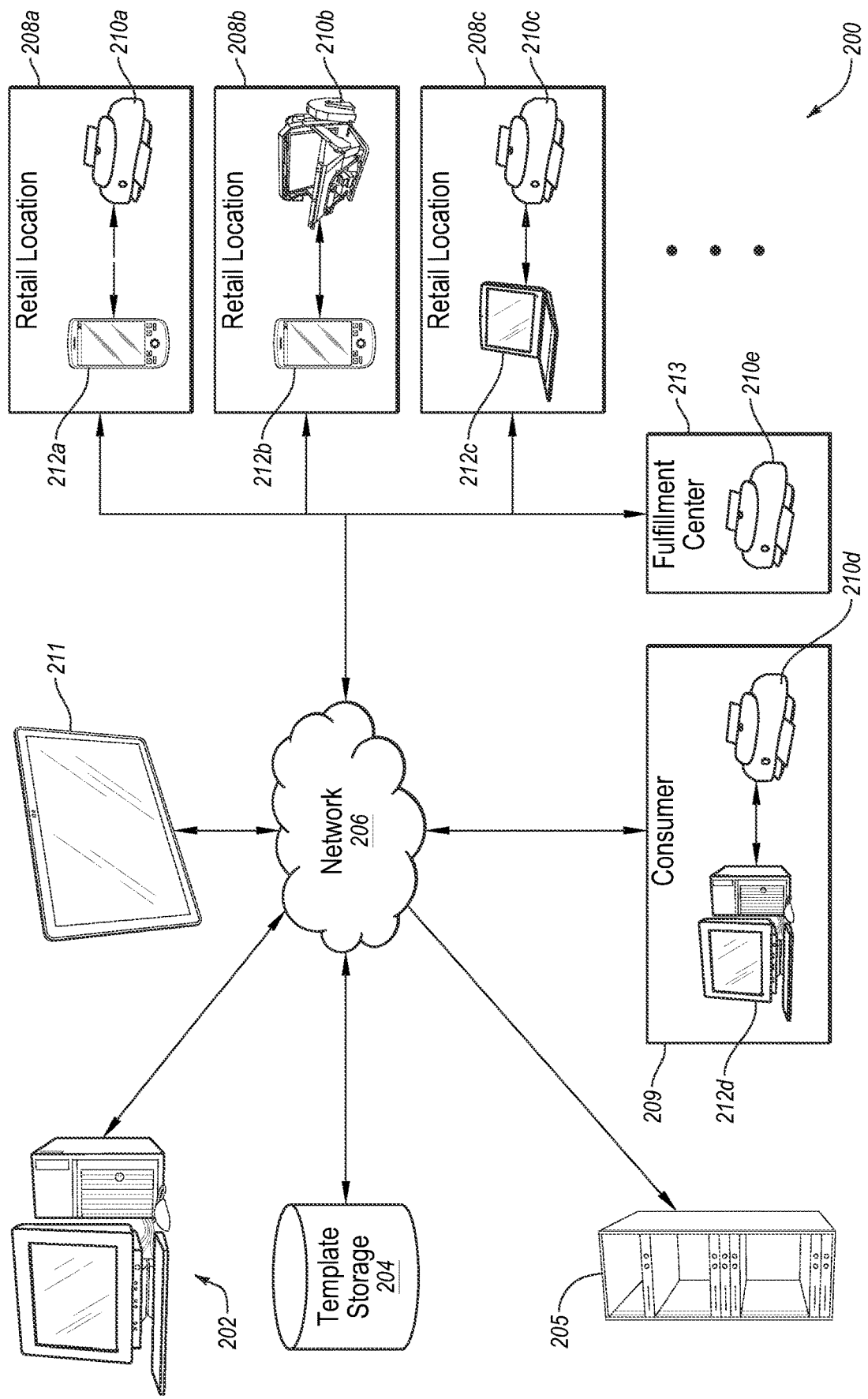
FIG. 2 is a schematic illustration of another example system for distributing digital templates, according to another example embodiment of the present disclosure.

The on-demand distribution system 100 generally described with reference to FIG. 1 is but one example of a distribution system that may be used in accordance with embodiments of the present disclosure to provide digital templates to recipients for use in producing electronic device accessories. FIG. 2, for instance, illustrates another embodiment of an on-demand distribution system 200 suitable for use in connection with the systems, methods and devices described herein, or which may be learned in view of the discussion herein. In general, the on-demand distribution system 200 may include various components similar to those described in relation to FIG. 1. Accordingly, to avoid unnecessarily obscuring the novelty of some aspects disclosed herein, the discussion of FIG. 1 may also generally be applied to the on-demand distribution system 200 of FIG. 2, except to the extent discussion is expressly described herein as being incompatible.

The on-demand distribution system 200 may include a provider system 202 including one or more computing devices which can communicate with optional digital template storage 204 and/or server components 205. Such communication may be provided using a network 206 as shown in FIG. 2, or may occur directly by bypassing the network 206. As also shown in FIG. 2, one or more recipients (designated as retail locations 208a-208c and consumers 209), may also be in communication with the network 206, which can optionally provide one-way or two-way communication with the provider system 202, digital template storage 204 and/or server components 205. Optionally, additional computing devices not necessarily associated with a retail location 208a-208c or consumer 209 (e.g., computing device 211) may be used by a provider or others for any number of reasons. As an example, the computing device 211 may be used to view, create, or modify existing digital templates, to request or send digital templates to a retail location 208a-208c or consumer 209, to view a history of digital template transfers or production using one or more particular digital templates, or for any number of other uses. The on-demand distribution system 200 may thus be used in various different manners, at least some of which are detailed in the following discussion. Of course, it should be appreciated that combinations of the manners of operation are also possible, as are entirely different systems and methods.

In one example embodiment, the on-demand distribution system 200 may act as a request system whereby one or more of the retail locations 208a-208c, or a consumer 209, may request a digital template for use in producing an accessory for an electronic device. Following such a request, the digital template may be retrieved from, or sent by, the provider system 202, digital template storage 204, computing device 211, or server component 205. For instance, an electronic production machine 210a-210d or electronic device 212a-212d may be capable of communicating with the network 206 to potentially request one or more particular digital templates from a provider (e.g., by communicating with the provider system 202). In response, the provider may access a digital template from local storage, digital template storage 204, a server component 205, or other suitable location, and provide the digital template to the corresponding retail location 208a-208c, consumer 209 or other requesting recipient. Alternatively, the server component 205 and/or digital template storage 204 may satisfy the request directly. In still another embodiment, a consumer 209 or retail location 208a-208c may request a digital template from another consumer 209 or retail location 208a-208c, or the provider system 202 may satisfy the request by sending a digital template stored by another retail location 208a-208c or consumer 209.

To illustrate an example manner in which the on-demand distribution system 200 may be used as a request-based system, an example may be considered where a smartphone or other electronic device becomes available to the public. Before or after the public release of the electronic device, the provider system 202 or computing device 211 may be used to create or access one or more corresponding digital templates. Upon completion of the digital templates, the digital templates may be stored in the digital template storage 204, at a server component 205, on the provider system 202, or in another location. When a first customer of a retail location 208a-208c requests an accessory corresponding to the newly available device, an application or program on a network capable device at the retail location 208a-208c, or an electronic production machine 210a-210c itself, may determine that the desired digital template is not available locally. The retail location 208a-208c may then initiate communication with the provider system 202, server component 205, digital template storage 204, computing device 211, or another retail location 208a-208c over the network 206 to search for or otherwise request the desired digital template. Upon finding such a digital template, it may request and then receive the digital template. After such receipt, the digital template may be used by a corresponding electronic production machine 210a-210c to produce the desired accessory. The retail locations 208a-208c requesting the digital template may then store the digital template locally, in an off-site or network accessible location, or in another manner so as to allow the digital template to be available and used to satisfy requests of subsequent customers. Of course, the digital template may also be pushed to one or all retail locations 208a-208c even absent a request for the digital template.

In one embodiment, the on-demand distribution system 200 may include or use software or applications specific to the on-demand distribution system 200 to enable transfer and use of digital templates. For instance, an application executing on the computing device 211 or on the electronic devices 212a-212d may have a local application designed specifically to communicate with the provider system 202 to request and/or receive digital templates, to report on production of accessories using digital templates, to process payments for accessories and/or materials, and the like. The same or another application may also be used to communicate with a corresponding electronic production machine 210a-210d. In another use of the on-demand distribution system 200, the system may provide digital templates using a cloud-based or software-as-a-service system. Under such a system, the retail locations 208a-208c and/or the consumer 209 may not use a particular application or program stored on the electronic devices 212a-212d or electronic production machines 210a-210d thereof. Instead, a web browser or other similar interface may be used. The application may instead run fully or partially on the server component 205 and/or the provider system 202. When the browser at the retail locations 208a-208c or consumer 209 is directed to an address corresponding to the application on the server component 205 or provider system 202, the browser may display information and data retrieved from the provider system 202 or server component 205. The information may include a listing of digital templates available on the digital template storage 204 or the internal storage of the server component 205 or provider system 202. If desired digital templates are available, the cloud-based system can send instructions through the browser to allow the information to be stored at the corresponding electronic device 212a-212d or electronic production machine 210a-210d. Optionally, the information received over the browser may also be used to send instructions to the electronic production machines 210a-210d to produce the desired protective film or other accessory.

In one embodiment, a cloud-based or software-as-a-service system may make the on-demand distribution system 200 highly scalable. In particular, in lieu of sending or pushing digital templates to each of a number of different retail locations, consumers, manufactures, or other parties, the provider system 202 may create or access a digital template and store the digital template potentially only once. Such a digital template may then be made accessible to a host application run by the server component 205 or the provider system 202. Each time a retail location, manufacturer, consumer, or other entity requests an accessory producible through use of the digital template, a corresponding computing device 211 may then access an instance of the host application so that the server component 205 or provider system 202 does the searching, hosting, and processing. As a result, processing may largely be done on the server-side. In addition, pushing or responding to application requests may be eliminated or reduced. Further, rather than having individual digital templates stored and accessible at various locations, a centralized, cloud-based store of digital templates may be used. Thus, once a digital template has been created, it may immediately be available without an additional request or without pushing it to particular retailers or consumers. Further, by using centralized storage, digital templates may have added security, which limits the ability of other entities to copy, distribute, or otherwise obtain access to digital templates.

To illustrate the manner in which the on-demand distribution system 200 may be used as a cloud-based or software-as-a-service system, an example may be considered where a smartphone or other electronic device becomes publicly available, after which the provider system 202 or computing device 211 is used to create a corresponding digital template. Upon completion of the digital template, the digital template may be stored in the digital template storage 204. A host application running on the server component 205 may also have access to the digital template storage 204 and/or be updated to identify the existence of the new digital template.

When a customer of a retail location 208a-208c requests a protective film or other accessory corresponding to the newly available device, a browser at the retail location 208a-208c may be directed to the address of the host application running on the server component 205. After optionally supplying valid authentication credentials, the browser may provide the same functionality as a dedicated application but without some or all of the processing requirements on the client side (i.e., at the retail location 208a-208c). Browsing and selecting the desired digital template may be handled by the host application on the server component 205. Upon selection, the host application may send the instructions for creation of the digital template through the browser and to the electronic production machine 210a-210c. In such a manner, the browser and systems at the retail locations 208a-208c may largely act as a pass through device. When another customer requests a protective film or other accessory corresponding to the same digital template, the same process may be repeated with the browser again replacing all or a part of a dedicated application.

Notable features of the cloud-based operation of the on-demand distribution system 200 may include the ability for secure use and distribution of the digital templates. Since the digital templates need not be directly stored by the recipient, use of the templates can be more easily restricted, monitored, and controlled. Further, each browser-based or other software-as-a-service access can be based on credentials which may limit how digital templates are used, which digital templates are available, and the like, depending on the authenticating entity. Some entities may, for instance, have a hybrid system that allows retrieval and local storage of digital templates while others may be limited to cloud-based access. In addition, as a central storage may be accessed for each use of a digital template, the server component 205 and/or provider system 202 may maintain historical records of each time a digital template is used. Such records may provide information about the type of accessory made, the date and time made, the location where made, the cost paid by a retailer for the digital template and/or a customer for the accessory, and the like. Such data may then be used to determine how many accessories were produced at a location over a period of time, what designs or accessories are the most popular, how often a machine is used, what sizes or types of materials are most often used, and the like. Of course, even in a push or pull system using a dedicated application, historical and tracking information may be sent from a retail location 208a-208c, or from a fulfillment center 213, for storage and use by the server component 205 and/or the provider system 202.

Where local storage of digital templates is not used or is limited (e.g., to most popular, current, or newest designs), the requirements on the retail locations 208a-208c and consumers 209 may also be reduced. Since thousands if not tens of thousands of digital templates may be available at any time, cloud based-storage may allow a retail location 208a-208c to use fewer resources and run a more efficient operation. Similarly, because the processing is largely handled at the server-side, the recipients may use smaller, less complex, less expensive devices, which allows more retailers to enter the market. Further, because the provider system 202 may only need to store the digital template once to make it available to all recipients, the reductions to the cost, time, and other overhead associated with pushing a digital template, or a modification to a digital template, to dozens or hundreds of recipients can be substantial.

While FIG. 2 illustrates an on-demand distribution system 200 in which retail locations 208a-208c and/or a consumer 209 may have an electronic production machine 210a-210d local relative to a separate electronic device 212a-212d, such an embodiment is merely illustrative. In other embodiments, for instance, the electronic production machine 210a-210d may include the computing device 211 as part of the electronic production machine 210a-210d. In other embodiments, the electronic production machine 210a-210d may be remote from a computing device 211. For instance, the computing device 211 may be remote relative to a retail location 208a-208c or fulfillment center 213. If the computing device 211 requests production of an accessory based on an available digital template, the digital template and/or request may be submitted to a corresponding retail location 208a-208c or the fulfillment center 213. For instance, with respect to the fulfillment center 213, the fulfillment center 213 may have an accessible address (e.g., a website URL) or supply an application which the computing device 211 uses to communicate with the fulfillment center 213. The fulfillment center 213 may include an electronic production machine 210e which can use a digital template or other instructions to produce the accessory. The computing device 211 may therefore effectively be used to operate the electronic production machine 210e, despite being remote relative thereto. The produced accessory may then be provided to the consumer 209 or a retail location 208a-208c in any suitable manner. Of course, communication between electronic devices 212a-212c and electronic production machines 210a-210c may occur in a similar manner (e.g., by passing through a communication network), or may bypass the network. In other embodiments, an electronic production machine 210a-210c or electronic device 212a-212c of a retail location 208a-208c may make a similar request to a fulfillment center 213.

Thus, while the computing device 211, or other requesting computing device, and the fulfillment center 213 may be remote, in other embodiments they may be in close physical proximity. The computing device 211 and fulfillment center 213 may also be commonly or separately owned or managed. For instance, a consumer 209 may carry a smartphone, tablet computing device, or other similar device to a mall, so-called "big box" store, or other location. Using an application available to the computing device 211, the consumer 209 can request and potentially pay for a to-be-produced accessory. The consumer 209 may also be able to select a fulfillment center 213 where the accessory can be produced and made available. For instance, a consumer 209 may see a production kiosk at a mall. The consumer 209 can use an application or browser on his or her computing device (potentially computing device 211) to select an accessory and send the request to that particular kiosk (e.g., using a website). The accessory may then be made as the consumer 209 waits. In some embodiments, the accessory may be produced on-demand, whether using a fulfillment center 213, retail location 208a-208c, consumer electronic production machine 210d, a kiosk, or other device. For instance, in one embodiment, the accessory is produced within two (2) hours of a request from the consumer 209. In another embodiment, the accessory may be produced within one (1) hour of a request from the consumer 209. In still other embodiments, the accessory may be produced on-demand, within thirty (30) minutes, within twenty (20) minutes, or within ten (10) minutes of a request. Delivery of the accessory to the consumer may also occur within the same time frame. Of course, a consumer 209 could also send a request for an accessory to a retail location 208a-208c, fulfillment center 213, or electronic production machine 210a-210d, and production and/or pick-up of the produced accessory may be scheduled for a later time.

It should also be appreciated that aspects of the on-demand distribution system 200 may be similar to those in the on-demand distribution system 100 of FIG. 1. For instance, in both systems, the capability may exist to provide or make available a digital template without a request from a recipient. In the on-demand distribution system 100 of FIG. 1, the digital template may be pushed to the recipient, while in the on-demand distribution system 200 of FIG. 2, some embodiments contemplate storing a digital template at a central or cloud-based location so that a digital template may be automatically available through a software-as-a-service application or similar application usable by the recipient.

The foregoing examples and descriptions corresponding to FIGS. 1 and 2 should be understood as illustrative. In other embodiments, for instance, a hybrid of a request, push, or cloud-based system may be provided. For instance, certain popular designs may be pushed for local use or storage by a recipient, while less common, premium, or other designs may be requested. Further, different retailers or other recipients may use different systems. One recipient may use an electronic production machine with integrated browsing and/or storage functionality. Another may use a different device connected to a computing device and/or local or offsite storage for digital templates. In some cases, a recipient is a consumer who purchases one-time or limited access to produce a protective film corresponding to a digital template, while other retail or manufacturing locations have greater access or usage rights.

Figure 3:
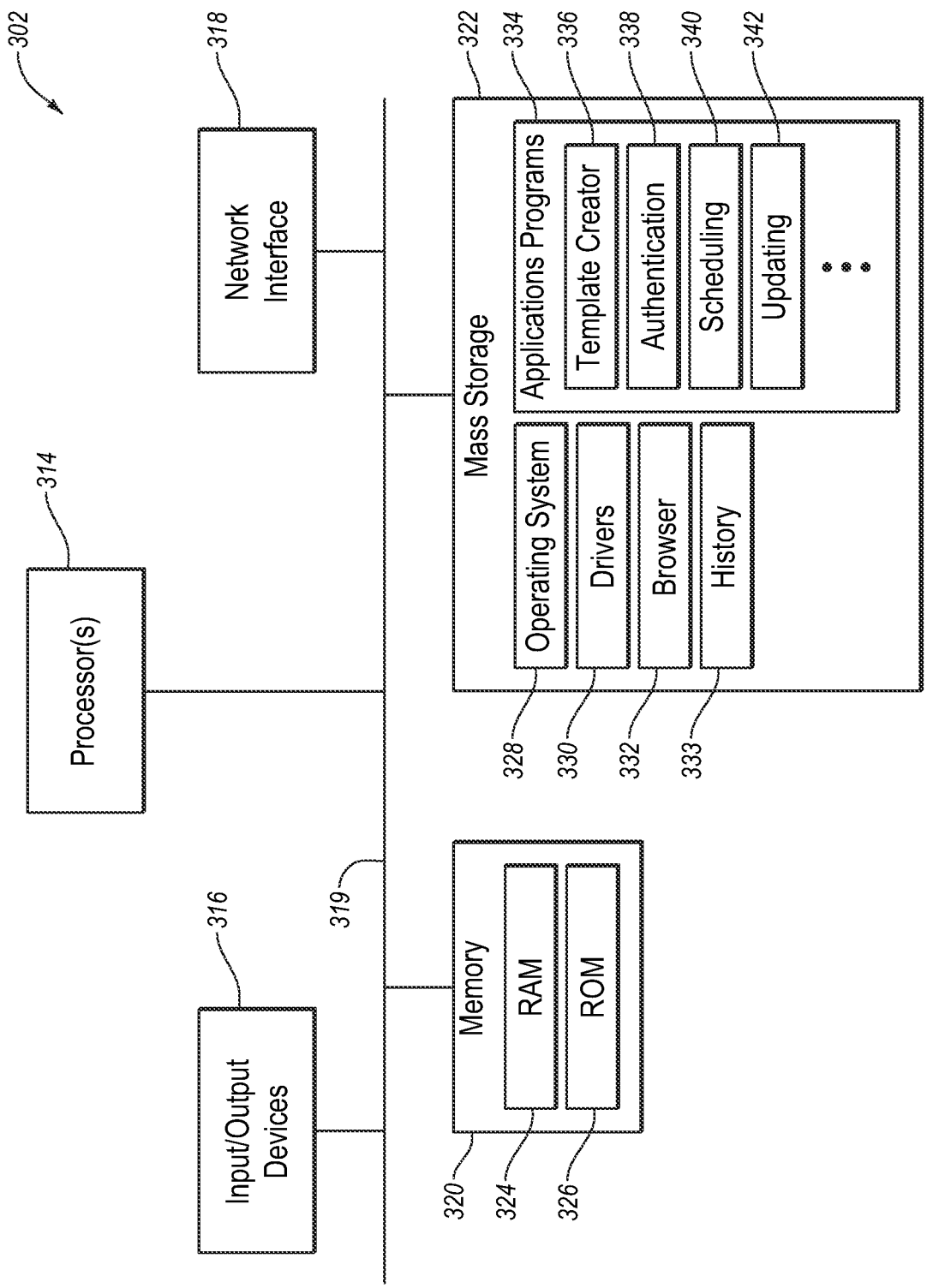
FIG. 3 is a schematic illustration of an example computing system for creating and/or providing digital templates to a recipient for production of accessories for electronic devices, the example computing system being usable within at least the systems illustrated in FIGS. 1 and 2.
Figure 4:
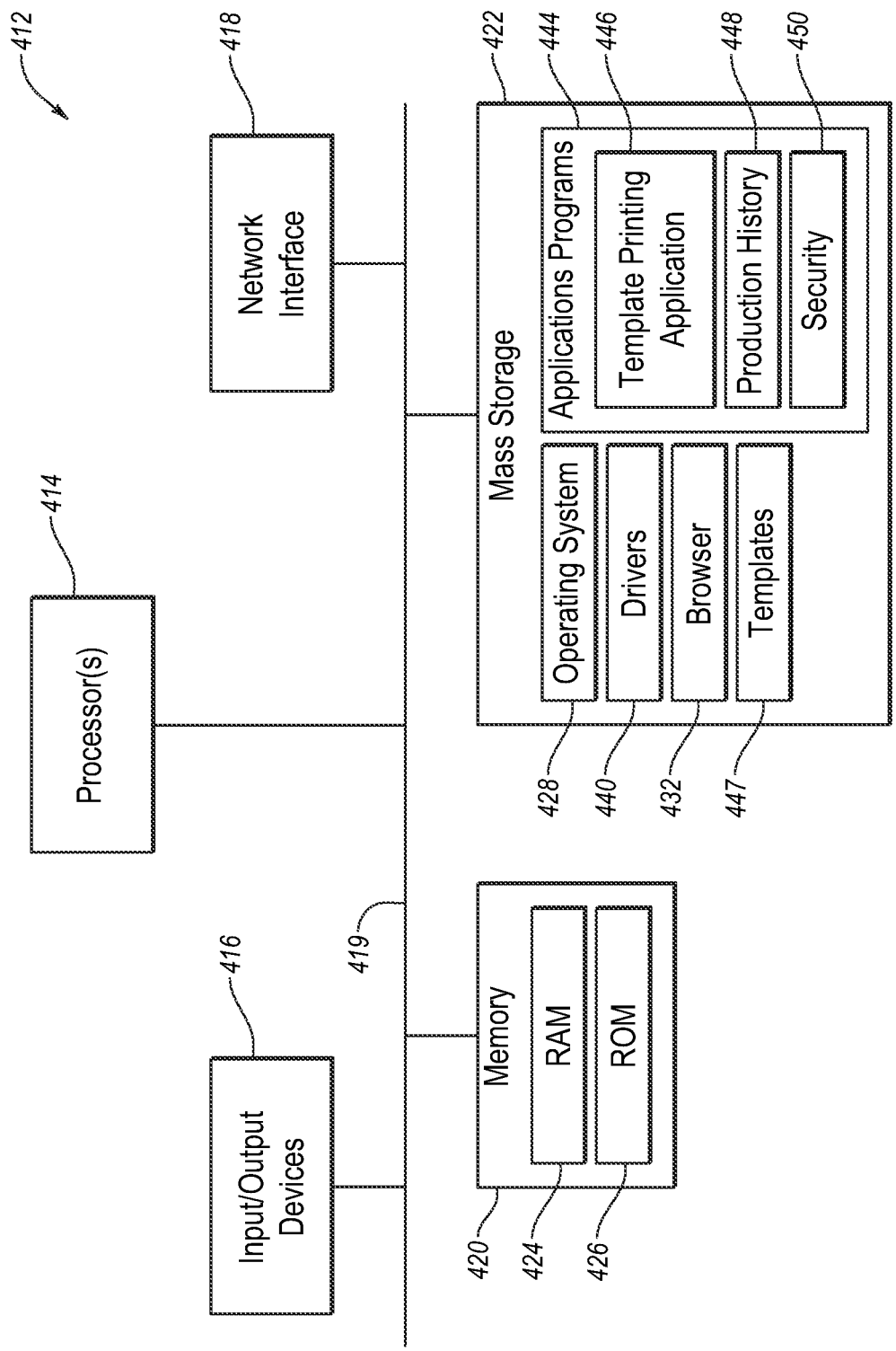
FIG. 4 is a schematic illustration of an example computing system for use in producing an accessory for an electronic device, the example computing system being usable within at least the systems illustrated in FIGS. 1 and 2.

Turning now to FIGS. 3 and 4, schematic examples of computing systems usable for the systems, services, or devices of FIGS. 1 and 2 are illustrated in greater detail. In particular, FIG. 3 illustrates an example of a computing system 302 usable as a provider system or server component, while FIG. 4 illustrates an example of a computing system 412 usable at a recipient system (e.g., as part of an electronic production machine, or as a computing system in communication with an electronic production machine).

In FIG. 3, the illustrated computing system 302 is illustrated as including a processor 314, various input/output devices 316, and a network interface 318. The processor 314 may generally include one or more processing components, including a central processing unit, capable of executing computer-executable instructions received or stored by the computing system 302. For instance, the processor 314 may communicate with the input/output devices 316 using a communication bus 319. The input/output devices 316 may include ports, keyboards, a mouse, scanners, printers, display elements, touch screens, other components, or any combination of the foregoing, at least some of which may provide input for processing by the processor 314. Similarly, a network interface 318 may receive or transmit communications via a network, and received communications may be provided over the communication bus 319 and processed by the processors 314 or other components.

The computing system 302 may also include memory 320 and mass storage 322. In general, the memory 320 may include both persistent and non-persistent storage, and in the illustrated embodiment the memory 320 is shown as including random access memory 324 and read only memory 326. Other types of memory or storage may also be included.

The mass storage 322 may generally be comprised of persistent storage in a number of different forms. Such forms may include a hard drive, flash-based storage, optical storage devices, magnetic storage devices, or other forms which are either permanently or removably coupled to the computing system 302. In some embodiments, an operating system 328 defining the general operating functions of the computing system 302, and which is executed by the processors 314 may be stored in the mass storage 322. Other components stored in the mass storage 322 may include drivers 330, a browser 332, historical information 333, and application programs 334.

The drivers 330 may generally refer to any number of types of data, programs, or information that facilitate use of the computing system 302 to communicate with other components either within, or peripheral to, the computing system 302. For instance, in an embodiment where an electronic cutting machine or other electronic production machine, a printer, a scanner or other device is peripherally attached to the computing system 302, the drivers 330 may store communication instructions indicating a manner in which data may be formatted to allow one or two way communication. A browser 332 may be a program generally capable of interacting with the processor 314 and/or network interface 318 to browse programs or applications on the computing system 302 or to access resources available from a remote source available over a network (e.g., the Internet, an Intranet, a wide-area network, a local-area network, an ad-hoc network, or other network, or some combination thereof).

The historical information 333 stored in the mass storage 322 may also include any number of types of information. In one embodiment, for instance, the historical information 333 may include information about specific digital templates (whether stored at the computing system 302 or elsewhere). Example information may include information on when a digital template was created, what electronic device the digital template corresponds to, when the digital template was sent to particular retailers or consumers, each time the digital template was used to produce an accessory, what classification of retailer or consumers can use the digital template (e.g., general use, premium only, etc.), and the like.

The application programs 334 may generally include any program or application that may be used in the operation of the computing system 302. Examples of application programs 334 may include word processing applications, spreadsheet applications, programming applications, computer games, and other applications. In at least one embodiment, the application programs 334 may include applications or modules capable of being used by a provider or server-side system in accordance with embodiments disclosed herein. In FIG. 3, for instance, the application programs 334 may include a digital template creator 336, authentication module 338, scheduling module 340 and/or updating module 342.

The digital template creator 336 may generally include one or more programs that may be used to develop, design, create, or modify a digital template or artwork. Such digital templates or artwork may be used in connection with a protective film or other accessory for an electronic device. As an example, a digital template may define the structure, size, shape, available materials, artwork locations, and/or features of a protective film for a particular electronic device. The program may be custom built for design of accessories for electronic devices, or may be an industrial design program of general applicability. In some embodiments, a single digital template creator 336 may be used to define digital templates in a number of different formats, to translate digital templates between formats, to create or modify artwork, digital templates, and other information, or the like. In other embodiments, multiple digital template creators 336 may be used to create different digital templates or different formats of a single digital template.

The authentication module 338, scheduling module 340, and/or updating module 342 may generally be used in connection with push, request/pull, and/or cloud-based systems similar to those disclosed herein. For instance, in a request or cloud-based system, a potential recipient may be required to enter credentials to authorize the user to access or receive digital templates. Such authentication may be handled by the authentication module 338. Additionally, or alternatively, the authentication module 338 may perform other functions. For instance, the authentication module 338 may also encrypt a digital template. The encrypted digital template may then be stored and/or transferred. Where transferred, a recipient may receive the encrypted digital template and then decrypt the digital template if the recipient has suitable authorization and/or keys.

A scheduling module 340 may be particularly used in a push system to schedule when different digital templates are to be sent out, although the scheduling module 340 may also be used in a request system. In any type of system, for instance, the scheduling module 340 may be used to obtain information about purchases and orders for inclusion in the historical information 333. The updating module 342 may include communication programs that operate with the network interface 318 to update digital templates, data, applications, or other information stored by a recipient, by a data store, a server, or other component. Other components and applications may also be stored on the computing system 302. For instance, the mass storage 322 may include a store of digital templates and/or data associated therewith.

Optionally, each of the application programs 334 may be executed by the computing system 302 in a non-distributed manner. In other embodiments, however, the application programs 334 may be distributed. For instance, an instance of the digital template creator module 336 may execute on the computing system 302 but be accessible through the network interface 318 in a cloud-based or software-as-a-service system. Any or all of the application programs 336 may be available in a similar manner.

In FIG. 4, the computing system 412 is illustrated as including one or more processors 414, one or more input/output devices 416, and a network interface 418. The processors 414 may generally include one or more processing components, including a central processing unit, capable of executing computer-executable instructions received or stored by the computing system 412. For instance, the processors 414 may communicate with the input/output devices 416 using communication bus components 419. The input/output devices 416 may include ports, keyboards, a mouse, scanners, printers, display elements, touch screens, other components, or any combination of the foregoing, at least some of which may provide input for processing by the processor 414. Similarly, a network interface 418 may receive or transmit communications via a network, and received communications may be provided over the communication bus components 419 and processed by the processors 414.

The computing system 412 may also include memory 420 and mass storage 422. In general, the memory 420 may include both persistent and non-persistent storage, and in the illustrated embodiment the memory 420 is shown as including random access memory 424 and read only memory 426. Other types of memory or storage may also be included. The mass storage 422 may generally be comprised of persistent storage in a number of different forms. Such forms may include a hard drive, flash-based storage, optical storage devices, magnetic storage devices, or other forms which are either permanently or removably coupled to the computing system 412. In some embodiments, an operating system 428 defining the general operating functions of the computing system 412, and which is executed by the processors 414, may be stored in the mass storage 422, although some or all of the operating system 428 may be stored in the memory 420 in other embodiments. Other components stored in the mass storage 422 may include drivers 440, a browser 432 and application programs 444.

The drivers 440 may generally be considered to be programs that allow the computing system 412 to communicate with other components either within, or peripheral to, the computing system 412. For instance, in an embodiment where the computing system 412 is used by a retail location having an electronic cutting machine or other electronic production machine, such a machine may be connected to the computing system 412. The drivers 440 may store communication instructions specific to the electronic production machine and which provide a roadmap of a manner in which data may be formatted to allow one or two way communication between the electronic production machine and the computing system 412.

A browser 432 may be a program generally capable of interacting with the processor 414 and/or network interface 418 to browse programs or applications on the computing system 412 or to access resources available from a remote source available over a network. In one embodiment disclosed herein, the browser 432 may be used in a cloud-based or software-as-a-service system for accessing available digital templates for protective films or other accessories. Optionally, the browser 432 may receive instructions for relay to an electronic production machine for production of a protective film or other accessory. A browser 432 may generally operate by receiving and interpreting pages of information, often with such pages including mark-up and/or scripting language code. In contrast, executable instructions may define other applications and be executable by the processor 414.

The application programs 444 may generally include any program or application that may be used in the operation of the computing system 412. Examples of application programs 444 may include word processing applications, spreadsheet applications, programming applications, computer games, audiovisual programs, design applications, and other applications. In at least one embodiment, the application programs 444 may include applications or modules capable of being used by a recipient-side system in accordance with embodiments disclosed herein. In FIG. 4, for instance, the application programs 444 may include one or more digital template printing applications 446, a production history application 448, and a security application 450.

A digital template printing application 446 may generally be a dedicated application or module, or set of applications or modules, on the computing system 412, and which may be usable to find, retrieve, review, create, or edit digital templates and/or cause production of accessories using such digital templates. In one embodiment, for instance, the digital template printing application 446 may be stored in executable, machine code and executed by the processor 414. When executed, the digital template printing application 446 may include one or more user interfaces that can be browsed by the user to identify available digital templates, select one or more digital templates, and send instructions corresponding to a digital template to an electronic production machine for creation of an accessory such as a protective film. In other embodiments, additional or other functions may also be provided. For instance, a digital template printing application 446 may include a conversion module for converting a digital template from one format to another. Further, any functions of the digital template printing application 446 may be provided by a single application or multiple applications.

When digital templates are accessed, created, modified, used for production of an accessory, or the like, information may be stored by the production history application 448. In general, the production history application 448 may be used to store any type of information related to a digital template or accessory, including information on who purchased an accessory, what price was paid for the accessory, who created the accessory request (e.g., which employee at a retail location, or which retail location among multiple retail locations), and the like. In some embodiments, a security application 450 may require that a user supply login or other security credentials. The supplied credentials may be used in conjunction with the production history application 448 to identify the user making a request for a digital template, modifying a digital template, or requesting production of an accessory.

As also illustrated in FIG. 4, the mass storage 422 includes an optional digital templates store 447. Such storage may be stored locally with other components or may be remote. For instance, the digital templates store 447 may be a remote store accessible using the network interface 418. Additionally, while some embodiments illustrate the digital template store 447 being included, other embodiments may not include a digital template store 447. For instance, some example embodiments of a cloud-based system can include central storage only such that a particular recipient system (e.g., computing system 412) may not persistently store any digital templates, although in other embodiments some but not all digital templates may be persistently stored. In some cases, storage of a digital template may occur in memory 420, and may even be non-persistent and stored for only such time, or in such portion, as needed to pass the digital template information to an electronic production machine.

Embodiments herein relate to systems, methods and devices for providing digital templates, including artwork and other decorative effects, that correspond to designs for accessories for portable electronic devices. In accordance with some embodiments, digital templates that are provided are then used by a retail location, manufacturer, distributor, fulfillment center, or even a consumer to create the accessory corresponding to the digital template. Any number of different devices and systems can be used to automate creation of the accessory using the digital template. Some such devices are large in nature and may be used by, for instance, a production facility to create dozens or even hundreds of accessories in a single batch. Such devices may include capabilities for combining and layering a digital template for simultaneous or sequential production of multiple accessories.

Figure 5:
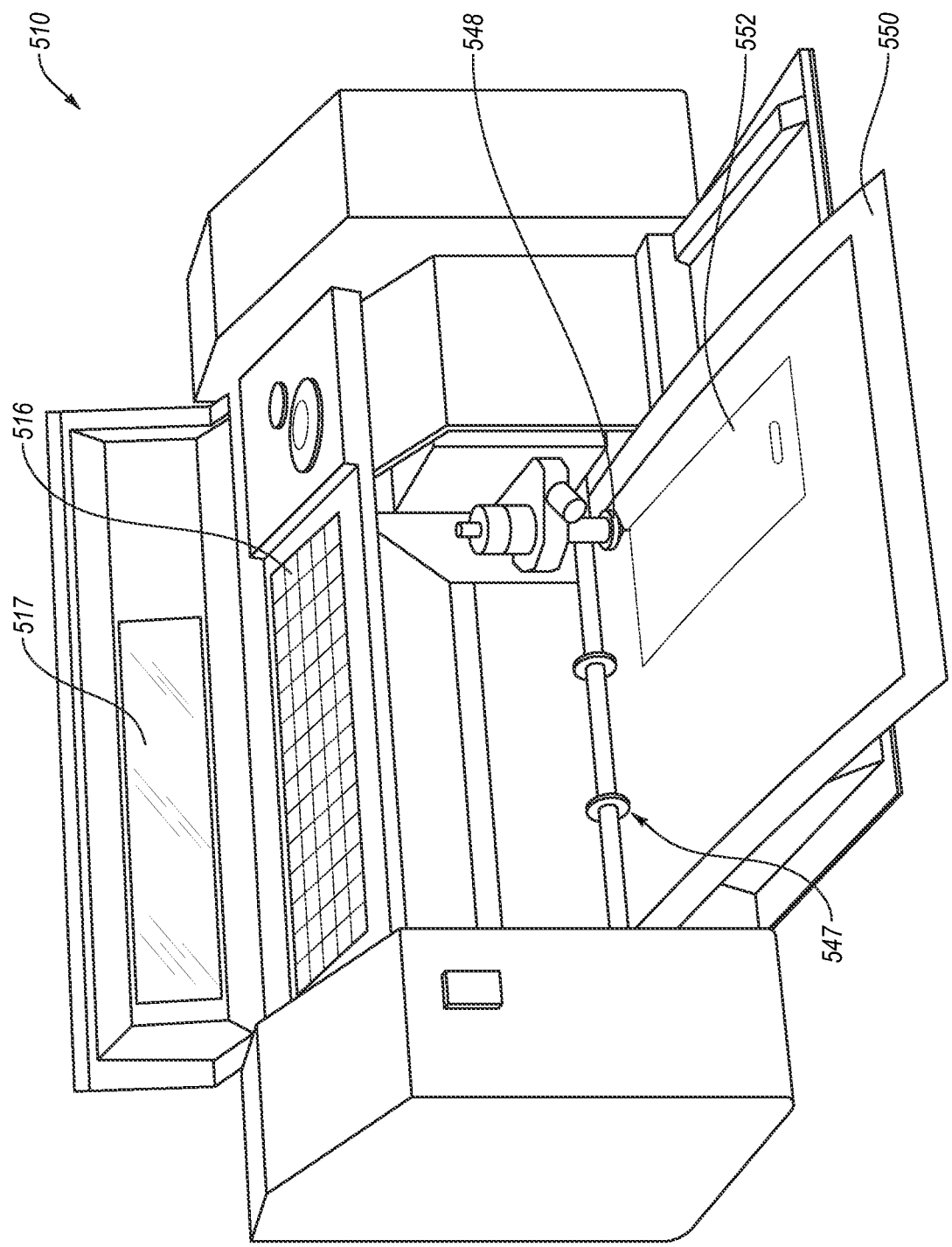
FIG. 5 is an illustration of an example electronic production machine usable in connection with at least the systems disclosed in FIGS. 1-4, according to some embodiments of the present disclosure.

Other embodiments may be smaller in scale. Indeed, in some embodiments a device may be a limited use device designed primarily for home or consumer use. In other embodiments, an electronic production machine may have capabilities falling between that of a large scale electronic production machine and a small scale home use machine. FIG. 5 illustrates one example embodiment of an electronic production machine 510 usable in connection with embodiments of the present disclosure. The illustrated electronic production machine 510 should be considered illustrative in all regards and not limiting of the present disclosure.

In FIG. 5, the electronic production machine 510 may generally take the form of an electronic cutting machine designed for smaller scale production, and may even be designed primarily for home or small business use. The illustrated electronic production machine 510 may include various components. For instance, the electronic production machine 510 may generally include a feed system 547. The feed system 547 may be designed to convey stock material 550 through or to a portion of the electronic production machine 510, and allow one or more production elements 548 of the electronic production machine 510 to then form the stock material 550 into a design 552 corresponding to a digital template provided to the electronic production machine 510. In this embodiment, the production elements 548 may include one or more cutting elements that can cut the stock material 550 into the design 552. Optionally, the production elements 548 may include multiple production elements for performing the same or different processes. As an example, different cutting elements may be used to produce different cuts (e.g., holes, lines, curves, perforations, etc.), or different production elements (e.g., cutting elements, embossing elements, printing elements, 3D printing elements, thermal bonding elements, etc.) may provide fundamentally different production operations.

In one embodiment, the electronic production machine 510 is programmable. Such programmable capabilities may allow the design 552 produced by the electronic production machine 510 to be varied in accordance with instructions provided by the user. In at least one embodiment, the programming may be input at an input device 516 of the electronic production machine 510. The illustrated input device 516 may include a keyboard, although other inputs may be provided. For instance, a memory card reader may be provided to allow access to programming, and a mouse, trackball, keyboard or other device may be used to select programming stored on the memory card. An output device 517, such as a display, may optionally facilitate such actions by a user. In other embodiments, a network communication interface may act as the input device 516 and allow programming or instructions to be passed directly to the electronic production machine 510. For instance, the network interface may include a browser or other components to allow direct communication with a central server, a wirelessly connected portable electronic device, or other remote source, and to allow such a source to control the electronic production machine 510. In some embodiments, the network interface may include an integrated computing device and/or storage to allow a user to contact a remote source and browse available digital templates, or to browse digital templates locally stored on the electronic production machine 510. In still other embodiments, digital templates stored on the electronic production machine 510, or accessible thereto, are pushed to the electronic production machine 510 even absent a request for the digital template.

According to at least one embodiment, a retail location may make use of the electronic production machine 510 to create an electronic device accessory on-demand. For instance, a provider may produce a digital template and the provider or a third party may supply the retail location with stock materials 550. Where the electronic production machine 510 is an electronic cutting machine, the stock materials 550 may include, for instance, rolls of film that may be fed into the electronic production machine 510 to be cut into a protective and/or decorative film. In some embodiments, stock materials 550 may be supplied in sheets, rolls, or other forms of a size that may be used by the production device 510, although in other embodiments the stock materials 550 may be cut to size following delivery.

When a customer requests an accessory to be made from the protective film illustrated as the stock materials 550, a person at the retail location may access a store of digital templates—either locally or over a network. Upon finding the desired digital template, the digital template can be selected and sent to the electronic production machine 510. Upon receiving such instruction, the electronic production machine 510 can feed the stock material 550 through the machine using the feed system 547 and use the production elements 548 with the stock material 550 to form the accessory. In at least one embodiment, the stock material 550 includes a plastic or polymeric film material that is generally transparent in nature. The stock material 550 may also include one or more layers attached to the polymeric material. Such layers optionally include an adhesive layer and/or a backing layer. The backing layer may, for instance, be placed over an adhesive layer to maintain a tackiness of the adhesive layer, while also being removable therefrom. In other embodiments, the stock material 550 may have other forms, and may include colored or opaque plastic or polymeric materials. Further, in lieu of, or in addition to, the production elements 548, the electronic production machine 510 may include one or more printing elements, 3D printing elements, embossing elements, thermal bonding elements, etc. that can print, emboss, stamp, or otherwise apply a decorative feature to the stock materials 550, or otherwise form a protective, decorative, or functional feature within an accessory.

In accordance with at least one embodiment, the electronic production machine 510 is configured to specifically be used with limited types of stock materials 550. For instance, production elements 548 may specifically be configured to cut, perforate, print, emboss, or otherwise operate in connection with plastic or polymeric materials such as those used in protective films. Examples of suitable protective films include those used or sold under the ZAGG or INVISIBLESHIELD names. In some cases, the electronic production machine 510 may be specifically designed for a specific film, although in other embodiments the electronic production machine 510 may designed for more widespread use. Such use may include use with multiple different types of protective films, different types of materials, different sizes or thicknesses of materials, and the like. For instance, the same electronic production machine 510 may cut or embellish transparent and/or colored protective film materials and may also cut or embellish other materials such as paper, cardstock, fondant, foam, or other products.

It should also be appreciated that in at least some embodiments, the electronic production machine 510 may include one or more communication elements. For instance, the electronic production machine 510 may include one or more ports or cables to connect to a local computing or electronic device. In other embodiments, the electronic production machine 510 may include a network interface to be able to connect to the Internet or another communication network. In such an embodiment, the electronic production machine 510 may interact with a provider system to receive digital templates, store digital templates, browse digital templates, review digital templates stored remotely, modify digital templates, or any combination of the foregoing.

As noted above, the illustrated electronic production machine 510 is merely illustrative of various devices that may be used in connection with embodiments of the present disclosure. For instance, although the illustrated embodiment may be a generally personal-use, small scale programmable cutting system such as the CRICUT devices available from PROVOCRAFT, such a production machine may instead be used by larger retail locations selling accessories for electronic devices to customers. When a customer requests a particular design, the electronic production machine 510 may be used to select, cut, and embellish the design even while the customer watches or waits for his or her accessory to be created. The accessory can then be installed according to instructions associated with the particular stock material 550 used and the type of accessory. In other embodiments, larger scale, higher volume cutting machines may be used for on-demand, real-time production of a protective film. Additional additive manufacturing processes may also be performed by the electronic production machine 510, depending on the accessory requested. As an example, a screen printing or other printing element may be provided to add decorative artwork or embellishments as specified by a digital template. Three-dimensional printing elements may also be used to form or otherwise create accessories such as cases, folios, bumpers, and the like.

The foregoing descriptions may generally relate to computing components and features. In some regards, the particular operation of certain computing components and features is not described in minute detail, as such understanding is not necessary for an understanding of the novel aspects of the present disclosure and may be well understood by those in the art.

Figure 6:
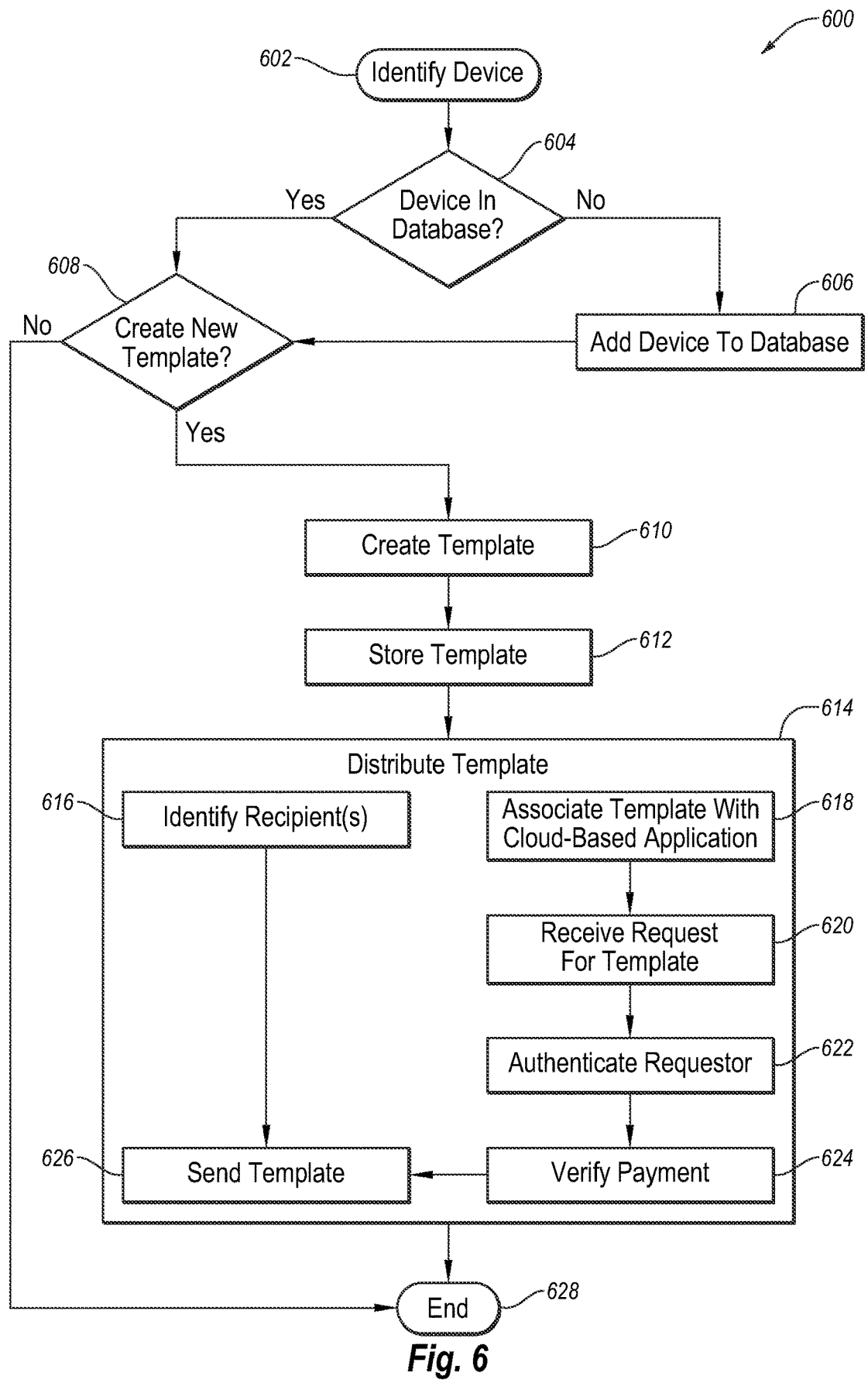
FIG. 6 is a flowchart of an example method for distributing a digital template to one or more recipients for production of an accessory for an electronic device according to some embodiments of the present disclosure.

Turning now to FIG. 6, an illustrative method 600 for providing a digital template for an electronic device accessory is illustrated and described. In general, the method 600 includes various steps or acts, any of which may be performed in numerous different orders. Accordingly, no inference should be made from the illustrated figures or description that any particular order of steps is required, or that all steps or acts are required.

In FIG. 6, the method 600 for distributing a digital template may include an act 602 of identifying an electronic device for which an accessory may be produced. Identifying the electronic device in act 602 may include receiving a request from a consumer for a particular type of electronic device or a particular model of electronic device. In other embodiments, an electronic device may be identified by monitoring newly released products from known manufacturers of electronic devices. Regardless of the manner in which an electronic device is identified, an inquiry may be made as to whether such an electronic device has been previously identified, such as by determining whether the electronic device, or digital templates corresponding thereto, are stored in a database (act 604). If the electronic device has not been previously identified, the electronic device may be added to a database in act 606. If the electronic device has been previously identified, or after the electronic device has been newly added to the database, a decision may be made in act 608 as to whether to create a new digital template corresponding to the electronic device.

If a digital template is not desired, the method may conclude in act 628. Alternatively, if it is determined that a new digital template is to be created in act 608, the method may include a further act 610 of creating the digital template. Such an act may include any of one or more components. For instance, to create a digital template, an electronic device may be measured, modeled, or deconstructed. A design program may also be used to model the electronic device and/or a digital template sized relative to one or more surfaces of the electronic device. The design program or other structure may also then be used to format the digital template in a computer-readable manner or in a format that may be read by a desired electronic cutting machine or other production device. Of course, a digital template may be created in other manners in act 610. For instance, if the digital template includes artwork, designs, embellishments, or other decorative features, such features can be created or identified and added to the digital template.

Upon creation of the digital template in act 610, an additional step 612 in the method 600 may include storing the digital template. The digital template may be stored in any suitable location and in a number of different manners. For instance, the digital template may be stored on a same computing device used to create the digital template and/or in one or more remote or other locations (e.g., a server, a data store, etc.). In other embodiments, storing of the digital template may include storing the digital template in multiple different formats accessible by different machines and/or cutting devices. In still another embodiment, storing the digital template in act 612 may include associating the digital template with metadata or other information so as to relate the digital template to a particular device, manufacturer, carrier, accessory SKU, production material, or the like.

After creation of the digital template in act 610, the digital template may also be distributed to one or more recipients, as shown in step 614. As discussed herein, distribution may occur in accordance with a number of different manners, some of which are generally illustrated in FIG. 6. In the illustrated embodiment, for instance, a push distribution system may include identifying one or more recipients (act 616) who are to receive the digital template. Identifying recipients may include identifying all potential recipients associated with the provider, or limiting the recipients based on location, authorizations, subscription level, or the like. Upon identifying who should receive the digital template, the digital template may then be pushed to the recipient by being sent to the recipient in act 626. Optionally, the digital template may then be stored for subsequent use by the recipient, or sent directly to an electronic production machine for storage and/or production of corresponding accessories.

In an alternative or additional aspect, distributing the digital template in step 614 may include associating the digital template with a cloud-based application, as shown in act 618. Such an act may include making the digital template available through an on-demand distribution system, whether by saving, marking, annotating, or otherwise identifying the digital template. In such an embodiment, an application running on a server component or provider system may have access to a data store in which the digital template is stored, including potentially the data store where the digital template is stored in act 612. Thereafter, a user may request a digital template, and the method 600 may include receiving such a request in act 620. In an example cloud-based system, receipt of the request may include a user selecting a digital template within a software-as-a-service application run on a server and accessed through a browser or other application on a smartphone, tablet computing device, PDA, computer, electronic production machine, or other device of the recipient. Alternatively, a directed request may be provided using an application running on a system or device of the recipient.

Regardless of the type of request received, a recipient may authenticate himself or herself. Such authentication may include entering of a password and/or username, demonstration of use of a particular IP or other address, or use of other security credentials. If the credentials match credentials known by the provider, then the requestor may be authenticated in act 622. Otherwise, authentication may be denied or further proof may be requested.

In some embodiments, a recipient may receive a digital template, or access to instructions of a digital template, only upon payment for the digital template. This may be particularly the case for a consumer granted access to the system and who wishes to produce an accessory such as a protective film or decorative skin. In other embodiments, however, retailers, manufacturers, or other potential recipients may pay for per-use access to digital templates or have subscription, franchise, licensing, or other relationships that allow use of digital templates based on monetary or other compensation. For instance, when payment is authorized, a distribution or production system may send payment information automatically to the provider of the digital template. The provider may then automatically obtain a per-item payment or royalty. In other embodiments, an entire amount of the payment may be sent to the provider. For instance, as discussed in greater detail herein, a self-serve kiosk may be used to produce accessories. Such a kiosk may be owned or provided by the provider of the digital templates, such that payment for accessories produced using the templates may pass primarily, if not fully, to the provider. A provider may also obtain payment in other manners. In one embodiment, for instance, in addition to providing templates, a provider may provide other instructions, including payment instructions, for indicating how payment is to be made (e.g., fully transmitted to the provider, partially transmitted to the provider, etc.). In some embodiments, stock film or other materials may be purchased from the provider or a particular supplier. Optionally, such purchases may give the purchaser access to some or all digital templates, or payment for the materials may be made in some part from the use of digital templates.

Once the request for the digital template has been received as shown in step 620, and following optional authentication and/or payment verification in acts 622 and 624, respectively, the digital template may be sent to the requestor in step 626. Sending of the digital template may include identifying the digital template, accessing it, and sending the digital template or instructions based on the digital template to the requestor, an electronic production machine associated with the requestor, or to some other location (e.g., a kiosk or fulfillment center). After such a digital template is sent, the method 600 may end in act 628.

The method 600 is illustrative of one method for distributing a digital template to a user, but may be modified to include other, additional or fewer acts or steps. For instance, in another embodiment an act of editing a digital template may be provided before the digital template is sent to a recipient. Such editing may include, for instance, customizing the digital template to include an insignia, logo or other feature specific to such a recipient. Accordingly, it should be appreciated that the method 600 should be non-limiting of the present disclosure and that steps and acts may be omitted, added, performed in series, parallel, or in different orders than those described and/or shown.

Figure 7:
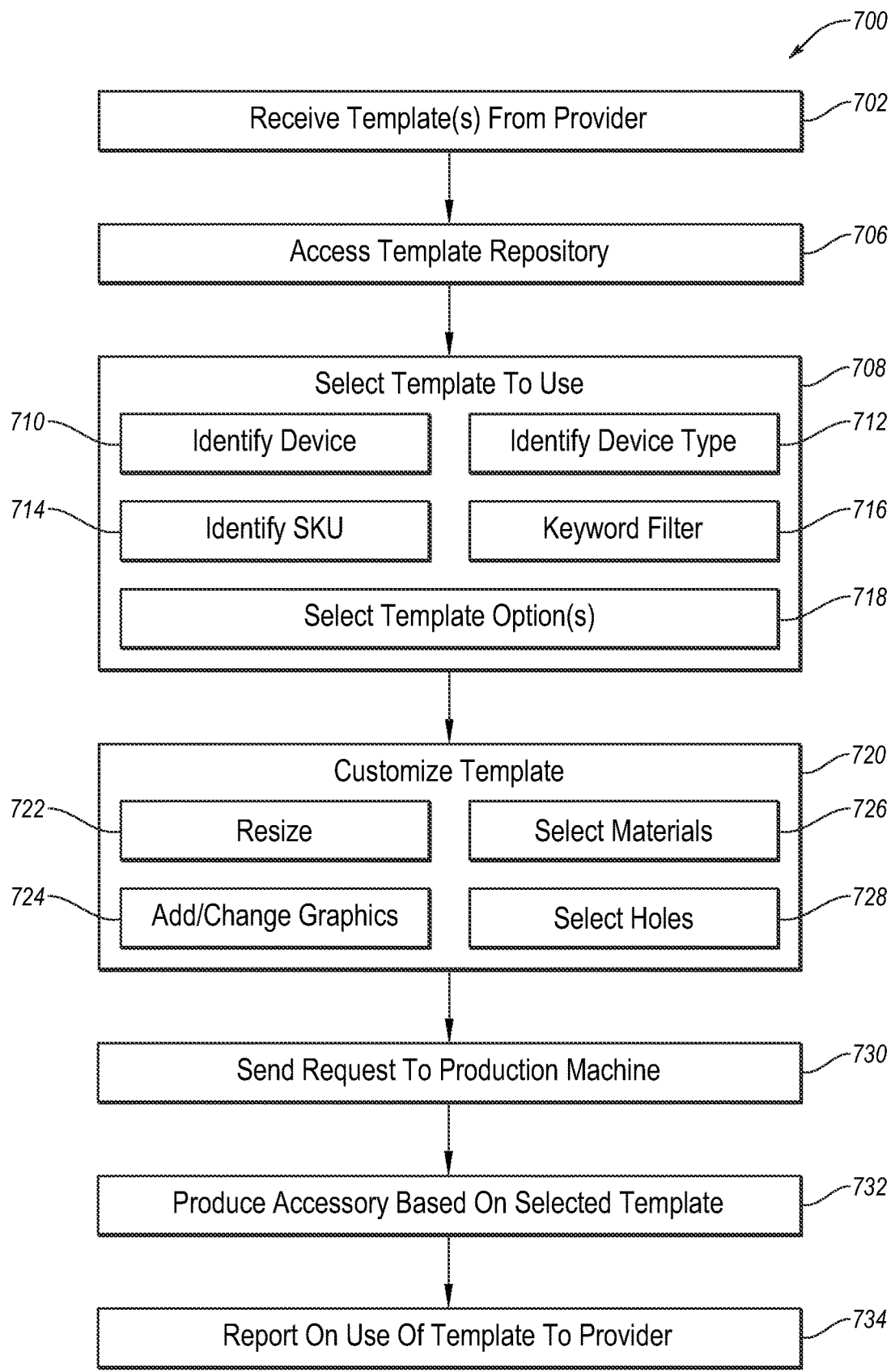
FIG. 7 is a flowchart of an example method for receiving digital templates defining corresponding accessories for electronic devices, in accordance with an embodiment of the present disclosure.
Figure 8:
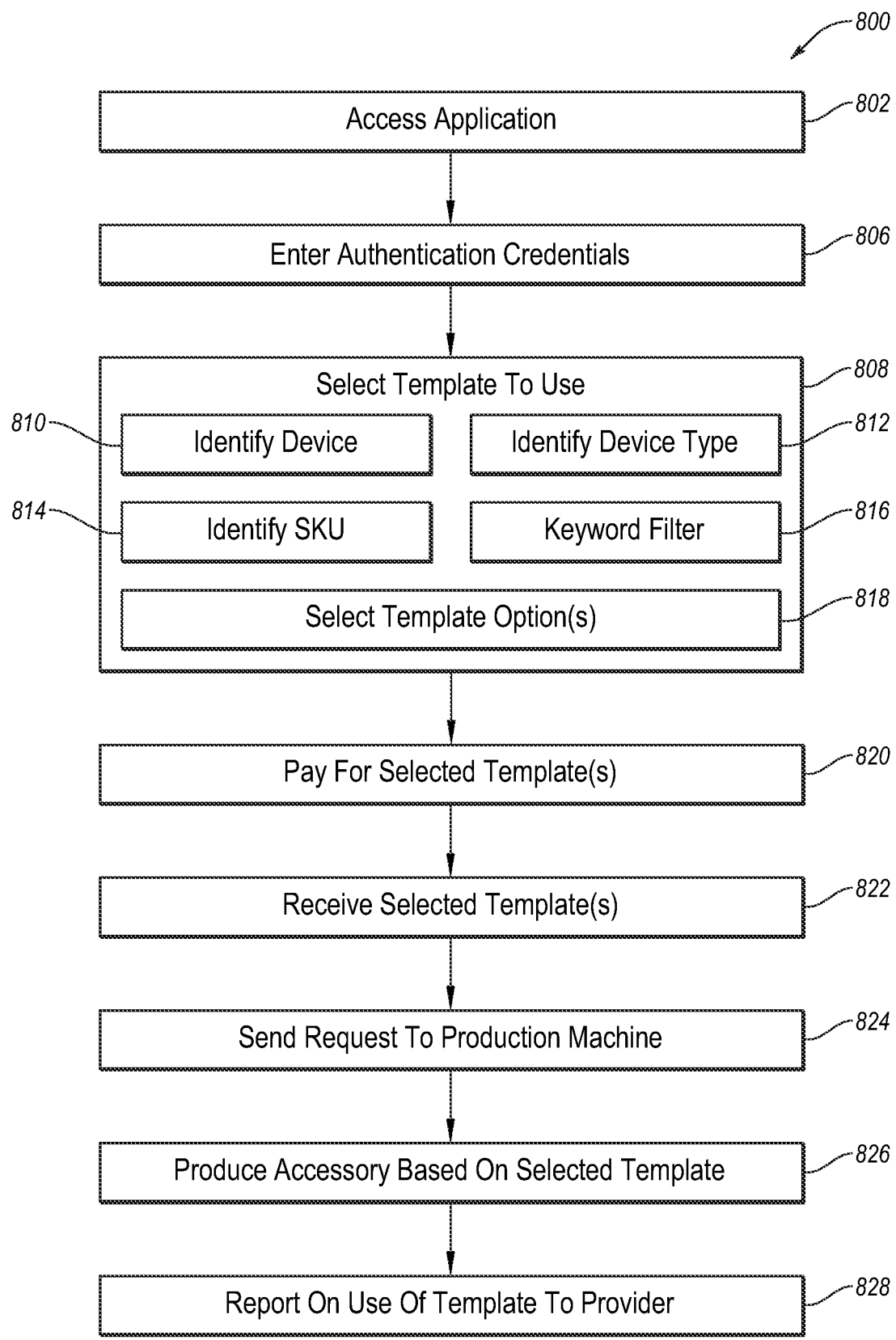
FIG. 8 is a flowchart of an example of another method for receiving digital templates provided for use in producing an accessory for an electronic device.

FIGS. 7 and 8 illustrate example methods 700, 800 from the perspective of the recipient of a digital template and/or accessory produced from a digital template. In particular, FIG. 7 illustrates an example method 700 which may be from the perspective of a recipient receiving a digital template pushed to the recipient, while FIG. 8 illustrates an example method 800 from the perspective of a recipient who has requested a digital template and/or who uses a cloud-based system for receiving access to a digital template for an electronic device accessory.

In FIG. 7, a recipient may receive a digital template from a provider, as shown in act 702. Such an act may be preceded by various additional acts of the provider or the recipient. Such acts may include establishing an account with the provider, associating an electronic or physical address of the recipient with the provider, obtaining stock protective film materials, obtaining specific equipment for communicating with the provider, authenticating a computing system with the provider, and the like. Moreover, receiving the digital template may include receiving an electronic communication with the digital template, or receiving a physical component, such as a computer-readable medium, having the digital template stored thereon.

After receipt of the digital template, a repository of one or more digital templates may be accessed as shown in act 706. Generally, accessing the digital template repository may allow a user to select a digital template to use, as shown in step 708. Such selection may relate to use of the digital template in production of an accessory such as a protective film or decorative skin for a portable or other electronic device. The digital template may also be selected for other uses (e.g., for editing or customization). Selection of the digital template in step 708 may include one or more different acts or components, some examples of which are shown in FIG. 7. For instance, in some embodiments, some or all digital templates may be associated with a particular electronic device, and metadata or other reference data may be associated with a digital template to indicate which electronic device the digital template corresponds to. In one embodiment, selection of the digital template may therefore include identifying the associated electronic device, as shown in act 710. In other embodiments, the type or category of the electronic device may be known, and the digital template may be identified or selected at least in part by using the electronic device type as shown in act 712. More particularly, if a consumer owns a smartphone, the smartphone category may be identified. Optionally, other selection criteria or filters may then be used, such as identifying various manufacturers or carriers, or by identifying the electronic device as shown in act 710.

Each digital template may also be associated with a particular identification of the accessory to which it corresponds. For instance, each accessory may have an associated SKU. If the SKU is known, the digital template corresponding to that SKU can be selected as shown in act 714. In still other embodiments, a keyword filter may be applied, as shown in act 716. Keywords may be used to filter digital templates based on digital template names and/or descriptions, associated metadata, related devices, and the like. For instance, if the style or brand name of the device to be used with the accessory is known, all or a portion of the name may be entered as a keyword and as a filter is applied, one or more matching devices may be identified.

Additionally, or alternatively, different digital template options may be available. For instance, for a single electronic device, there may be numerous different digital templates available. One digital template may relate to a protective film to cover all or a portion of only one surface of the electronic device, while another relates to a protective film to cover all or a portion of a different surface of the electronic device. Still other digital templates may relate to a protective film for use in covering portions of all surfaces of the electronic device. In other embodiments, different sizes may be provided depending on the portions of the device to cover or protect, or different styles may be available depending on whether logos should remain visible, whether artwork is to be added, what color of materials are desired, and the like. Accordingly, in at least some embodiments a recipient system may be used to select one or more digital template options as shown in act 718.

In other embodiments, a digital template may not be specifically created to have the desired features. In such an embodiment, a digital template may be customized. Step 720 of the method 700 illustrates some manners in which a digital template may be customized. For instance, if a digital template is not of a desired size, the digital template can be resized in act 722. Resizing the digital template may include modifying the size in one or more dimensions. Additionally, if artwork, custom text, embellishments, graphics, or other decorative features are to be added, such features can be added or changed in act 724. In such an act, new graphics can be created or identified and added, and new or existing graphics can be re-positioned, re-sized, or modified in other manners.

Still other aspects of customizing a digital template in step 720 may include selecting materials for the digital template (act 726). For instance, if a protective film is to be produced, the user may select a transparent film material to cover the display and potentially other surfaces of an electronic device. In some embodiments, other materials—including opaque or colored materials—may be used on other surfaces, or potentially the display. The display and other surfaces may also use different types of materials (e.g., different polymer construction, different thicknesses, etc.). In at least some embodiments, the accessories may have holes or openings therein, and an act 728 may include modifying the size, position, or existence of such holes. For instance, some users may prefer to include an opening in an accessory to allow a logo to show through, while other users may prefer to cover the logo. As a result, the digital template may be customized by selecting whether or not certain holes or openings are to be included. Openings may also be selected for other reasons, including for access features (e.g., ports, cameras, etc.) or even for purely decorative reasons.

Upon selection of the digital template to be used for an accessory, and potentially upon customizing the digital template, a request can be sent to the electronic production machine as shown in act 730. Such a request may include the design and/or instructions specified by the digital template so as to obtain an accessory for an electronic device, and which has the proper size, shape, decorative aspects, or other features, or some combination thereof. When the request is received by the electronic production machine, the accessory corresponding to the selected digital template can be cut or otherwise formed and produced as shown in act 732.

In accordance with some embodiments of the present disclosure, it may be helpful to track which digital templates are used, how often a digital template is used, what changes are often made to a digital template, and the like. The recipient may therefore store such information, and optionally, as shown in FIG. 7, provide certain information to the provider. This information may be reported in real-time, in periodic updates, or in any other form. The information reported back to the provider may also be used by the provider. For instance, the provider may track real-time, or near real-time, sales of its retail locations, franchisees, or other affiliates. Popularity of certain designs can also be determined across an industry and/or in a particular location. For instance, if a particular digital template design, decorative style, or the like is popular in an area, the provider may pre-produce and package such designs. Those products may then be sent to a retailer in the same area. On the other hand, if a particular digital template or other design is not selling well, the provider may adjust the price of a digital template, offer promotions, or the like, in an attempt to increase sales of accessories, including pre-packaged accessories, in that area.

FIG. 8 also illustrates an example method 800 for producing an accessory based on a digital template received from a provider, as detailed herein. In some embodiments, the method 800 may include a recipient accessing an application, as shown in act 802. The application being accessed may be resident on a local machine of the person or entity accessing the application, or the application may be remote or distributed. In one embodiment, for instance, the application is a cloud-based or software-as-a-service application. According to one aspect of the present disclosure, a software-as-a-service application may reside on a server and be accessible over a network through a browser. Where the application is local, the application may receive pushed digital templates so that the digital template repository is updated in about real-time, or the digital templates may be available upon request through the application.

Upon accessing the application, authentication credentials may be entered, as illustrated in act 806. Such credentials may take any form, and may include a login name and/or password, provision of an address, biometric information, other data, or any combination thereof. The authentication credentials may correspond to a particular person or to an entity. For instance, an employee at a retail location may have particular credentials specific to the employee. In other embodiments, credentials may be the same for all employees of a particular retail location. If the employee or retail location has suitable permissions, the employee requesting access to the application may then be able to perform aspects of the method 800 of FIG. 8. Without suitable permissions, the employee may be denied access and unable to complete some or all of the steps or acts of the method 800.

Upon verification of the authentication, a digital template recipient may be allowed to continue and to select a digital template to use (step 808). Such selection may relate to use of the digital template in production of a protective film or other accessory for an electronic device, and/or for other uses (e.g., for editing or customization of the template). Selection of the digital template in step 808 may include one or more different acts or components, some examples of which are shown in FIG. 8. For instance, in some embodiments, some or all digital templates may be associated with a particular electronic device, and metadata or other reference data may be associated with a digital template to indicate the electronic device to which the digital template corresponds. In one embodiment, selection of the digital template may therefore include identifying the associated electronic device, as shown in act 810. In other embodiments, the type or category of the electronic device may be known, and the digital template may be identified or selected at least in part by using the device type as shown in act 812. As an example, if a consumer owns a tablet computing device, the tablet category may be identified. Other categories may also be identified based on the particular electronic device. Optionally, other selection criteria or filters may then be used, such as identifying various manufacturers or carriers, or by identifying the electronic device as shown in act 810.

Each digital template may also be associated with a particular identification of the accessory to which it corresponds. For instance, each electronic device accessory may have an associated SKU. If the SKU is known, the digital template corresponding to that SKU can be selected as shown in act 814. In still other embodiments, a keyword filter may be applied, as shown in act 816. Keywords may be used to filter digital templates based on digital template names and/or descriptions, associated metadata, related devices, and the like. For instance, if the name of a device is known, all or a portion of the name may be entered as a keyword and a filter may be applied to identify one or more matching devices.

Additionally, or alternatively, different digital template options may be available. For instance, for a single device there may be numerous different digital templates available. One digital template may relate to a protective film for a display, while another relates to a perimeter bumper. Still another product may relate to a protective film or cover for surfaces other than, or in addition to, the display. Accordingly, in at least some embodiments a recipient system may be used to select one or more digital template options as provided for in act 818.

In at least some embodiments, a user may be allowed or required to pay for a selected digital template, as shown in act 820. Such payment may occur after selection and prior to receipt of the digital template, or may be billed later. In other embodiments, advance payment may be made, or there may be no associated payment. For instance, use of the digital template may be included as part of a subscription agreement, or by virtue of a franchise or distribution agreement with the provider. If payment is made, verified, or otherwise not at the time required, the selected digital template can be received, as shown in act 822. Receipt of the digital template may include storing the digital template locally in persistent or non-persistent storage. In other embodiments, the digital template may be received as a set of instructions sent directly to a cutting machine in a request (act 824). Thus, acts 822 and 824 may be combined in some embodiments. Following sending of the request, the product corresponding to the digital template may be produced (act 826).

Producing the accessory product in act 826 may involve multiple acts or steps as well. For instance, an electronic and/or programmable cutting machine for producing a protective film may need to be powered on, have its dies or other cutting tools installed or replaced, be supplied with stock material, or the like. Additionally, or alternatively, producing the product may include layering or otherwise combining multiple digital templates together, batch producing digital templates, or the like.

Optionally, a recipient system performing the method 800 of FIG. 8 may also report information back to the provider (act 828) with respect to a digital template used and/or an accessory produced. For instance, similar to the discussion provided above with respect to the method 700 of FIG. 7, information may be reported to allow a provider to track real-time sales, to view purchasing trends, and the like. In some embodiments, payment for use of an on-demand distribution and/or production system may include charges for templates and/or charges for use of the system (e.g., based on use of an electronic production machine). Historical information reported to the provider may allow the charges to be determined. Optionally, an auto-payment or other option may be provided to allow for payment at the same time historical information is provided.

The methods of FIGS. 7 and 8 illustrate various example acts and steps, which may be performed in the illustrated orders. In other embodiments, however, certain acts or steps may be added, omitted, or performed in different orders. Accordingly, no inference should be drawn that any act or step of methods 700, 800 is required or must be performed at a particular time in relationship to another act or step.

As also shown in FIGS. 7 and 8, one aspect of the present disclosure may include using a recipient system in selecting or causing selection of a particular digital template to be used for production of an accessory for an electronic device. As discussed herein, such selection may include use of an application resident on a computing or other electronic device of the recipient, which may then access and potentially edit a local or remote store to obtain the desired digital template. The selection may even include selection on an electronic production machine which has designs transferred electronically thereto and/or which uses a storage medium such as a card or cartridge. In other embodiments, a remote application may be used with selection resulting in a production or other request being sent to the electronic production machine of the requestor.

Regardless of the specific mechanism or application by which a digital template is selected, one or more user interfaces may be used to facilitate the selection. Examples of such user interfaces are shown in FIGS. 9-16. It should be understood that such user interfaces are merely illustrative and are not intended to limit the scope of the pending disclosure, limit searching or filtering digital template designs by any specific criteria, or the like. Rather, such user interfaces are intended to provide a broad range of options by which a user or requestor may identify a digital template for an accessory, such as a protective film, so as to create an on-demand product for a customer or other consumer.

Figure 9:
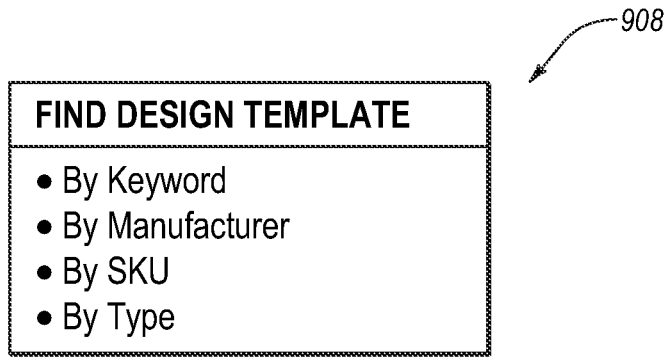
FIG. 9 is an example graphical user interface usable to select a digital template in the methods in FIGS. 6-8.

FIG. 9 illustrates an example user interface 908 that may be used to find and ultimately select a digital template usable in the production of an accessory for an electronic device. As shown in FIG. 8, the user may use the user interface 908 to filter and/or search for digital templates using a number of different criteria. In this embodiment, some of the criteria that may be used include a keyword search, a filter based on the manufacturer of the device, filtering based on a SKU, or filtering based on a category or type of device. In some embodiments, a user input device, such as a mouse, trackball, keypad, touch screen, other element, or any combination of the foregoing, may be used to select one of the search or filter options. Moreover, the criteria may be expanded to optionally include other types. For instance, the interface could also allow selection of digital templates by a carrier (e.g., mobile phone carrier), a material used (e.g., plastic film, silicone, hard-plastic, etc.), or any other suitable criteria.

Figure 10:
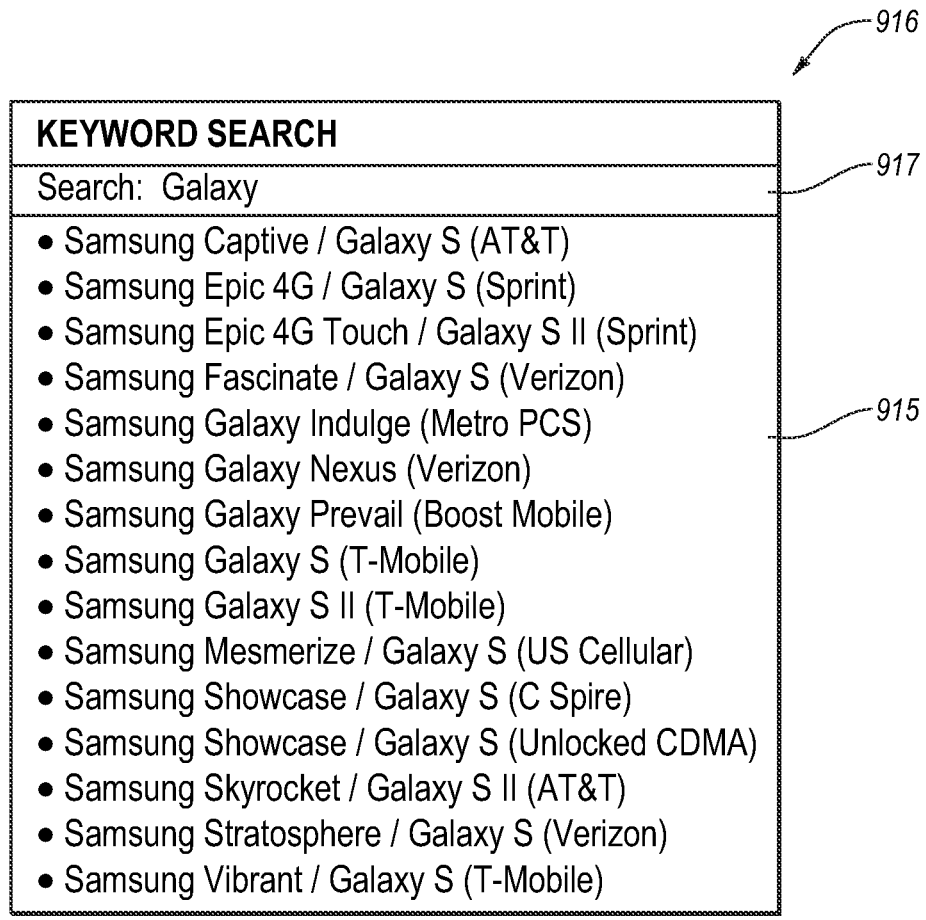
FIG. 10 is an example graphical user interface usable in the methods of FIGS. 6-8 to select a digital template based on a keyword.

FIG. 10 illustrates an example of a user interface 916 that may be used to select a digital template once a user has selected a keyword search option from the user interface of FIG. 8. In this option, the user interface 916 may provide a search term area 917 where a user can input one or more search terms. Such a search may use Boolean, natural language, or other search options, and may include advanced options to limit searches based on other criteria (e.g., manufacturer, product name, etc.). In this embodiment, the term "Galaxy" has been entered into the search term area 917, which has resulted in a number of different Samsung products that include the term "Galaxy" being identified in a separate search results area 915. The search results listed in the search results area 915 may include results with exact matches to the search criteria, although such results could also be expanded to include similar terms.

Figures 11, 12:
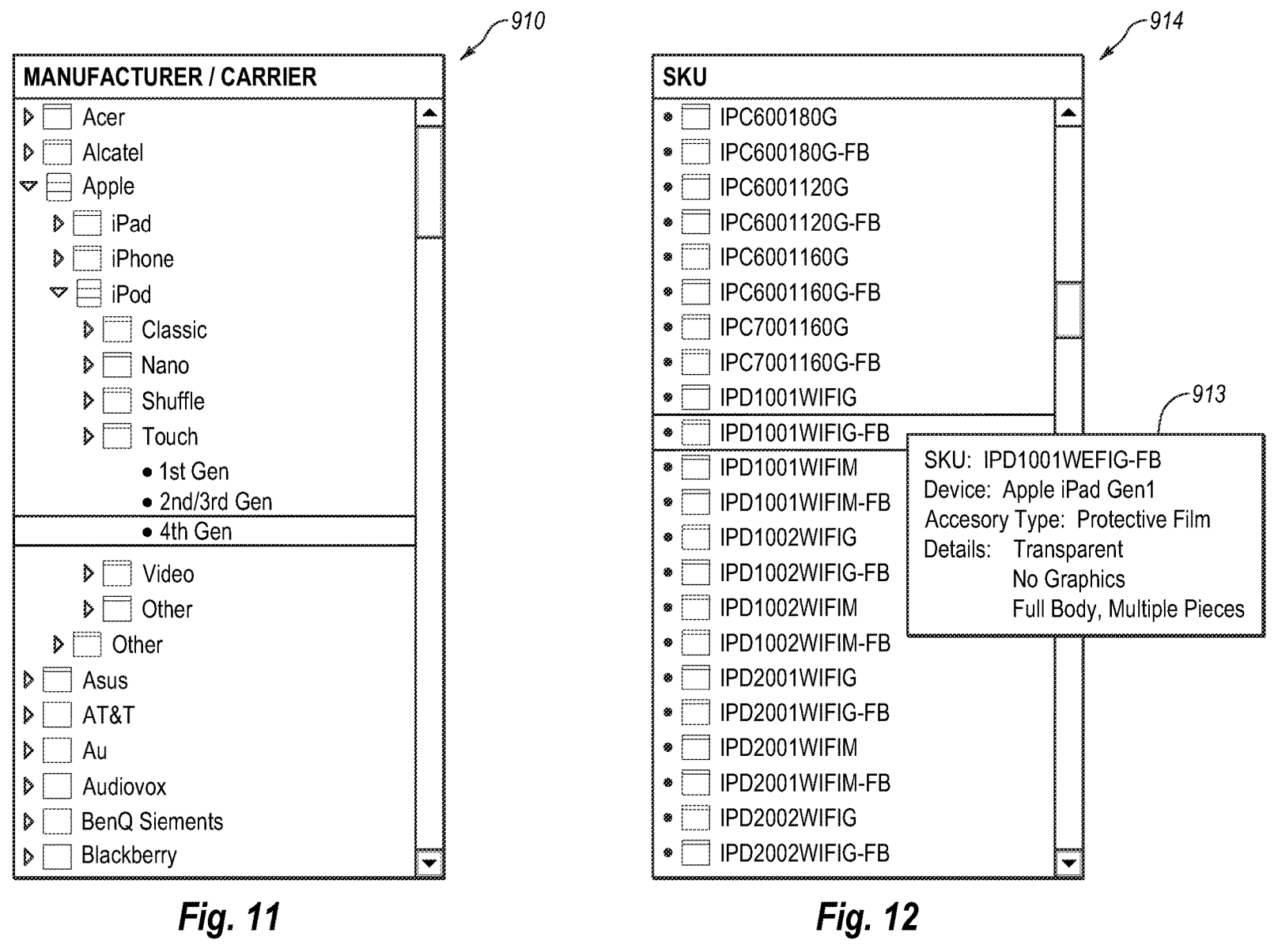

In another embodiment, a user may narrow the search based on the manufacturer of the device or the carrier/seller of an electronic device. In FIG. 11, a user interface 910 illustrates an example in which different manufacturers of electronic devices are identified. Optionally, such manufacturers may be selected to identify different electronic devices they sell. Different electronic devices may be identified by name, brand, category, or some other criteria. In this embodiment, the manufacturer of "APPLE" has been selected to identify different products it produces, including "IPAD," "IPHONE," "IPOD," and other products. The IPOD product has also been selected to expand various different types of IPOD products. In this example, a fourth generation of APPLE'S IPOD TOUCH product has been identified and selected.

In still other embodiments, a SKU number may be used to identify a digital template and/or accessory to produce in an on-demand accessory production system. FIG. 12, for instance, illustrates an example user interface 914 having multiple different SKUs listed. Each SKU may be selectable. Optionally, an information pane 913 is provided so that when a SKU is highlighted or otherwise identified, information about the SKU can be displayed to the user. Such information may be used to identify the corresponding electronic devices for which the digital template may be used, and any additional details about the SKU (e.g., the product category, materials from which it is made, dimensions, descriptions of graphics, etc.).

A SKU may relate to any number of different items. For instance, each different accessory may have a corresponding SKU. In other embodiments, a SKU may represent a SKU of different types of electronic devices. In such a case, a user with an electronic device may look for a SKU number on the device and then use that SKU number to identify one or more corresponding digital templates. Of course, a serial number, product number, or the like may also be used rather than a SKU.

Figure 13:
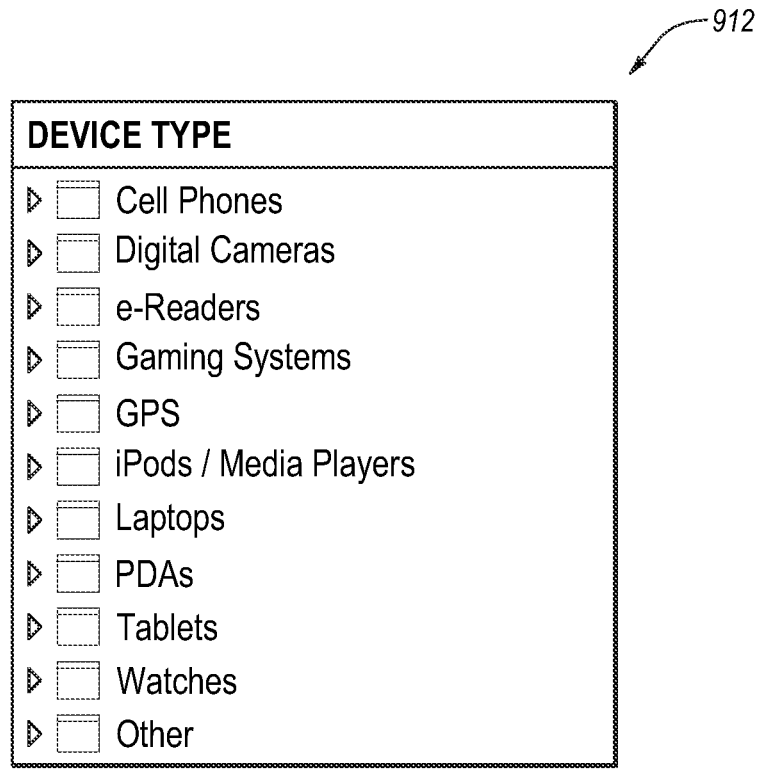
FIG. 13 is an example graphical user interface usable in the methods of FIGS. 6-8 to select a digital template based on a category of electronic device.

FIG. 13 illustrates still another example embodiment of a user interface 912 for selecting a digital template that may be used in the production of an accessory. In this particular embodiment, the user interface 912 may be used to select or filter electronic devices or accessories based on the type or category of the electronic device. For instance, if a user has a mobile phone or smartphone, the "Cell Phones" category may be selected, whereas if a user wants an accessory for a tablet computer, the "Tablets" option may be selected.

Figure 14:
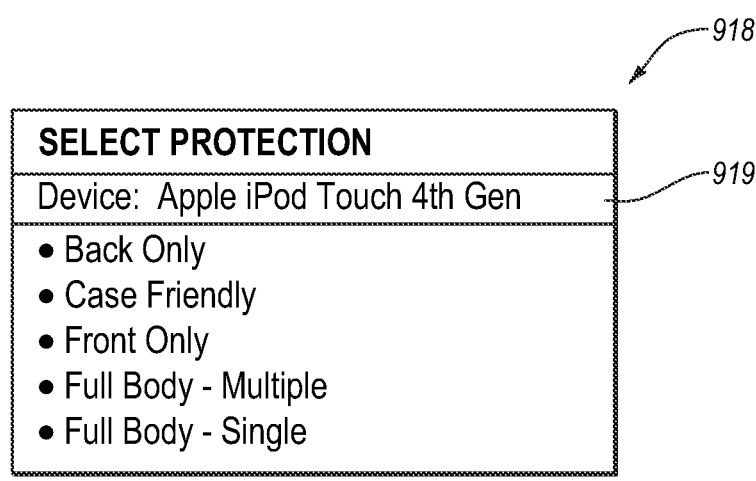
FIG. 14 is an example graphical user interface usable in the methods of FIGS. 6-8 to select a digital template based on a type of use desired for an accessory for an electronic device.

FIG. 14 illustrates another user interface 918 that may be used to identify a digital template. In the illustrated user interface 918, an identification region 919 is included and identifies one or more previous selections made by a user. For instance, the identification region 919 currently indicates that a user selected an electronic device that is the fourth generation of a so-called APPLE IPOD TOUCH product. Such selection may have been made using any of a variety of different interfaces, including any one of the user interfaces in FIGS. 9-14, or using a combination of such interfaces. Indeed, in one embodiment, multiple interfaces may be used. For instance, a selection may first be made to limit the type of electronic device, after which manufacturers of that electronic device category are listed. A keyword search could be performed on that listing to identify a particular electronic device which is then listed in the identification region 919 of the user interface 918.

In the particular embodiment of the user interface 918 illustrated, multiple digital template options may be available for a single electronic device. For instance, in this embodiment the identification region 919 may include an option to produce a protective film for protecting a back surface only, a case friendly option with a potentially reduced size, a front only protection option, a full body option with multiple, separate film pieces, or a full body protection option with a single, integral film piece. As with other user interfaces herein, a user may select one of the options. For other accessories, other types of options may be presented.

Figure 15:
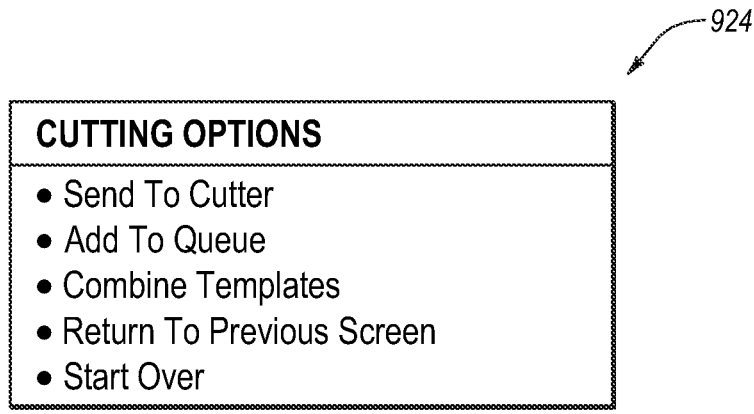
FIG. 15 is an example graphical user interface usable in the methods of FIGS. 6-8 to select production options for an accessory for an electronic device, where the accessory comprises a protective film.
Figure 16:
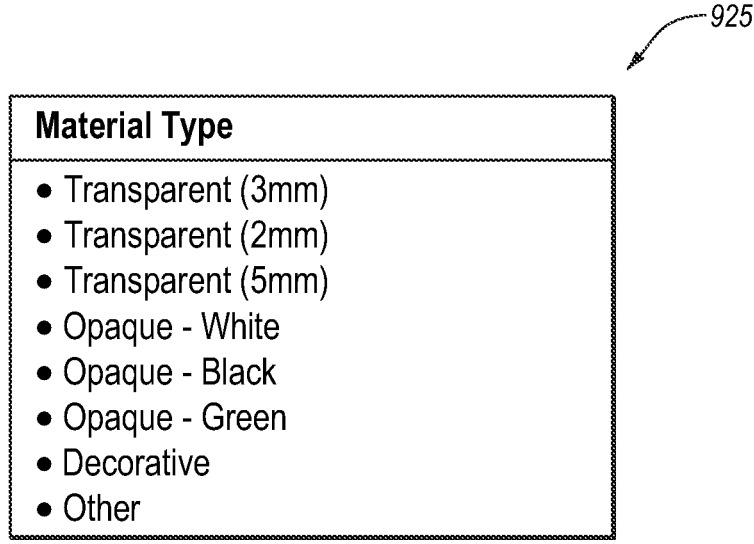
FIG. 16 is an example graphical user interface usable in the methods of FIGS. 6-8 to select an accessory to produce based on the type of material used in producing the accessory.

Upon selecting the particular style of an accessory, the corresponding digital template may be identified in some embodiments. Another user interface 924 may then be provided as shown in FIG. 15. In this embodiment, different options for producing the protective film or other accessory corresponding to the digital template may be available. Such options illustratively include an option to send the digital template to an electronic production machine for cutting, adding the digital template to a queue, combining the digital template with other digital templates for production, and options to return or start over to select a different option. Based on the selected option, still other or additional options may be provided. For instance, FIG. 16 illustrates still another embodiment of an interface 925 that may be presented to a user. In this embodiment, an accessory may include a protective film for on-demand production, and the user may be given the option to select a particular material to use. Such materials may vary by color, type, translucence, or in other manners. Optionally, the interface 925 may also be used to add graphics or embellishments. For instance, upon selecting the "Decorative" option, a user may be presented the option for adding or changing pictures, text, embossings, and the like. Of course, where a different accessory type is to be produced (e.g., a bumper, keyboard, case, etc.), different options for materials and the like may be presented and selected.

Further, while the illustrated user interfaces generally include textual descriptions of devices, SKUs, device categories, and the like, other elements may be used. For instance, pictures of different devices may be provided or, in some embodiments, a picture of a device may be used to automatically identify the device. Examples of additional interfaces are discussed in additional detail with respect to FIGS. 22-26.

Figure 18:
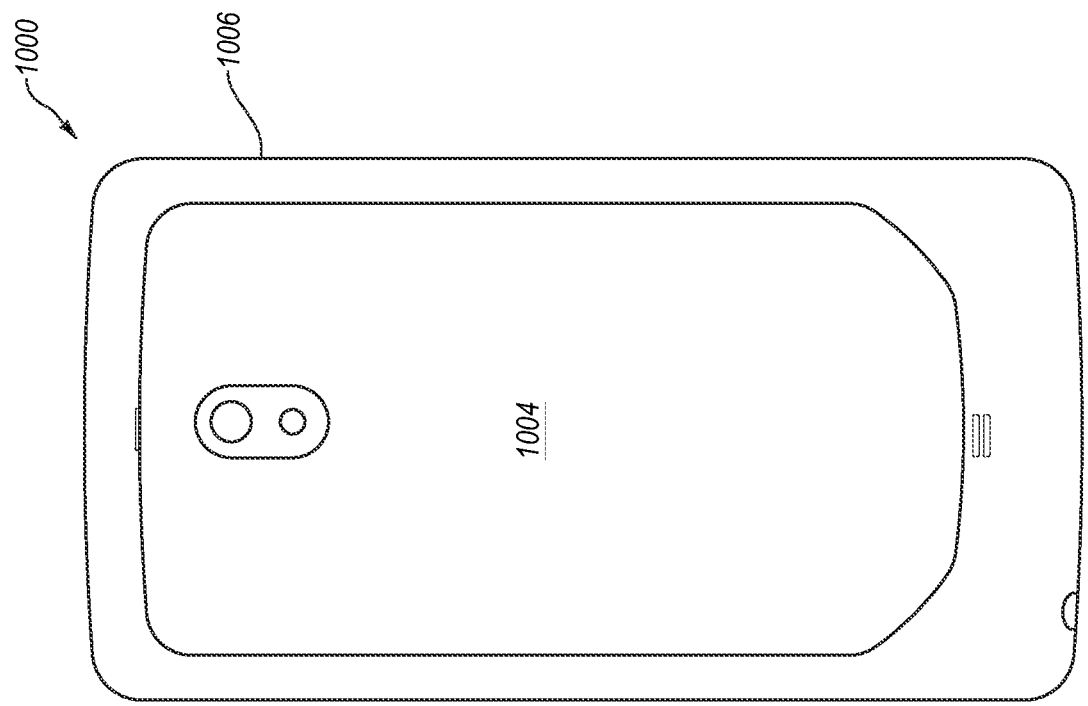
FIGS. 17 and 18 show respective front and rear views of an example electronic device that may be used in connection with an accessory for an electronic device as produced on-demand in accordance with embodiments of the present disclosure, the illustrated example electronic device being a portable electronic device.
Figure 17:
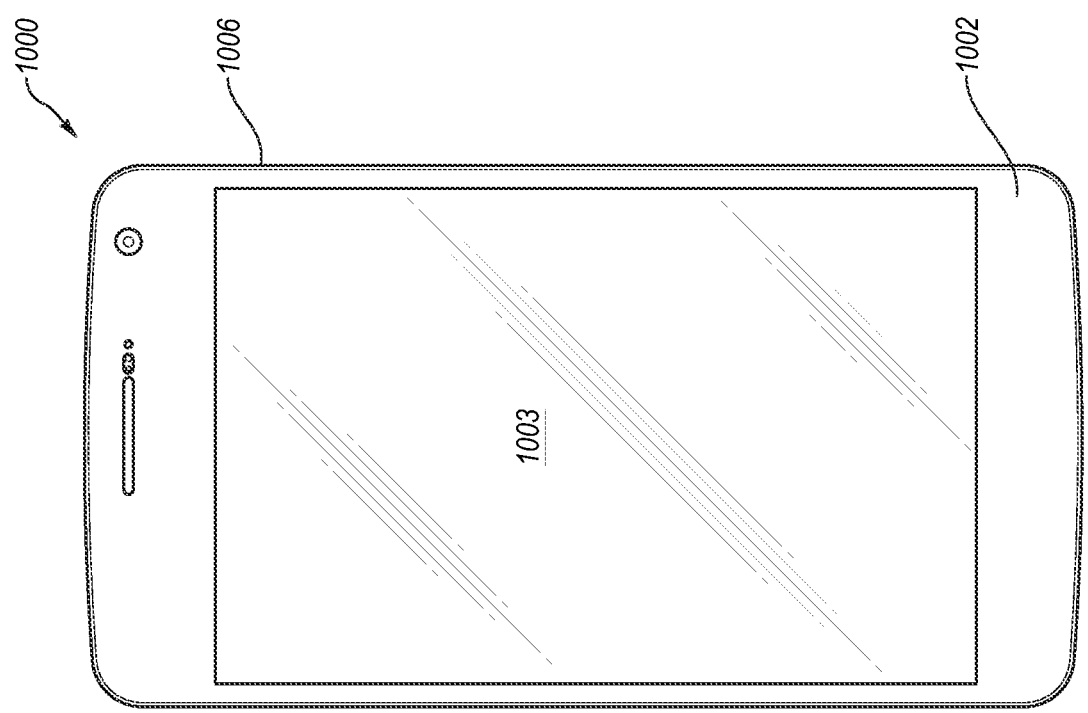

Using the illustrated user interfaces, or any other interface or system consistent with the disclosure herein, one or more accessories may thus be produced for an electronic device, or other device, system, or machine. FIGS. 17 and 18 illustrate an example of one electronic device for which the disclosed systems, methods, devices, and products may be provided. In the illustrated embodiment, a portable electronic device 1000 is generally shown and includes a front surface 1002 and a rear surface 1004. A peripheral surface 1006 (or set of peripheral surfaces) may generally define the sides of the portable electronic device 1000 and extend between the front and rear surfaces 1002, 1004. In accordance with one embodiment, a user of the portable electronic device 1000 may want an accessory for use with the portable electronic device 1000. As one example, a protective film may be produced to protect one or more surfaces of the portable electronic device 1000. For instance, the front surface 1002 may include a display element 1003. If scratched, broken, or otherwise damaged, the utility of the portable electronic device 1000 may be impaired. Consequently, a protective film may be applied to reduce the risk that the display element 1003 will crack, scratch, or break.

Additionally, the front surface 1002, rear surface 1004, and/or peripheral surface 1006 of the portable electronic device 1000 may have other components, including cameras, speakers, microphones, volume controls, power controls, near-field communication elements, flashes, lights, or other components. It may be desirable to protect some elements from damage. For instance, a camera lens may be covered with a film material that is generally transparent, and which can reduce or prevent scratches to the lens and preserve the quality of images that are taken. Other components may not be covered. For instance, a power or volume control may include button that is depressed for operation, so it may remain uncovered. Still other surfaces may be covered if for no other reason than to prevent or reduce the risk of scratches reducing the aesthetic quality of the surface.

Figure 19:
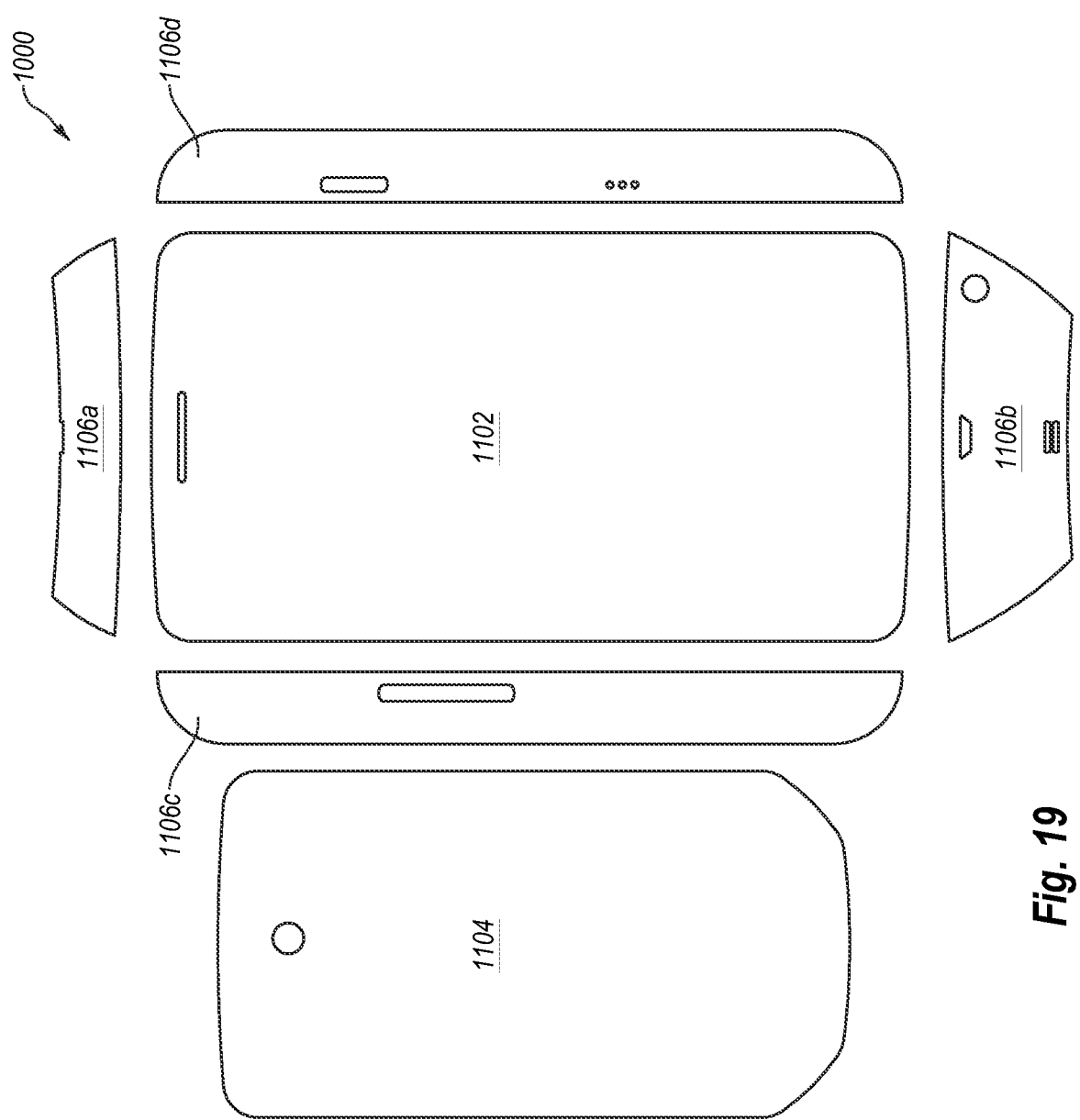
FIG. 19 illustrates an example accessory for an electronic device, the accessory including a protective film producible in accordance with methods and systems of the present disclosure to protect and/or decorate the electronic device of FIGS. 17 and 18.

An embodiment of a protective film 1100 usable to protect some of the surfaces of the portable electronic device 1000 is shown in FIG. 19. In the illustrated embodiment, the protective film 1100 may generally include multiple pieces 1102-1106d that may provide full or near full protection of the portable electronic device 1000. For instance, the protective film 1100 may be cut or otherwise produced from a protective film material and shaped to include a first piece 1102 generally sized and/or shaped to mate with the front surface 1002 of the portable electronic device 1000 of FIG. 17. A second piece 1104 may generally correspond to the size and/or shape of a rear surface 1004 of the portable electronic device 1000 of FIG. 18. Separate pieces 1106a-d may also be produced to correspond to the different sides of the peripheral surface 1006 of the portable electronic device 1000 of FIGS. 17 and 18.

In some embodiments, the systems, methods, and devices of the present disclosure may be used to produce the illustrated protective film 1100 of FIG. 19, but other accessories may also be produced using the same systems, methods, and devices. In at least one embodiment, a digital template may be created and supplied within an on-demand distribution and/or production system using a push distribution system, a request/pull distribution system, a cloud-based or software-as-a-service cutting system, another type of distribution or cutting system, or any combination of the foregoing. Indeed, in some embodiments, the digital template produced and used to cut the protective film 1100 may be selected using interfaces such as those disclosed herein and which relate to a full body protection digital template. In other embodiments, only a single one of the pieces of the protective film 1100 may be produced. For instance, a digital template may specify only the protective film first piece 1102, and relate such a digital template to a front-only protective film, or an interface may be provided to allow a user to select only piece the protective film first piece 1102 to be produced. Different digital templates may optionally be used to specify any or all pieces individually or collectively. As also illustrated, various slots, holes, or other features may be cut into one or more surfaces of the protective film 1100 to correspond to cameras, lenses, flashes, ports, speakers, microphones, or other features of the associated portable electronic device 1000, and such features may be indicated by the corresponding digital template.

Accordingly, embodiments of the present disclosure may relate to dynamic, on-demand, and/or real-time production of a protective film or other accessory customized for a particular electronic device and/or for a particular user. Optionally, such an accessory is based on a digital template supplied via an electronic communication system, or on physical computer-readable media, and which is usable by an electronic production machine that can produce the accessory from available materials (e.g., protective film). The digital template itself may be supplied in an on-demand or real-time fashion as well, such that soon after creation of the digital template, the digital template may be pushed or otherwise made available to remote electronic production machines to allow creation of corresponding accessories.

The electronic production machine may take any suitable form, and in one embodiment is an electronic and/or programmable cutting machine. Optionally, such a machine may be portable, be equipped for network communication, or have other capabilities. In other embodiments, a machine may be used to produce other types of accessories, such as keyboards, bumpers, cases, and the like. (e.g., using an additive manufacturing machine, process, system, or element).

As discussed herein, some embodiments contemplate a distribution and production system in which a provider system provides digital templates for accessories to a recipient system. Digital templates may be provided in accordance with a push process whereby upon creation of a digital template, the digital template may be stored at a central location and pushed to one or any number of recipients. By pushing digital templates in this manner, nearly as soon as a digital template is created for an accessory for an electronic device, that digital template may be available in a wide geographical area, and potentially worldwide, for production of accessories. In other embodiments, a request or pull system may be used. Optionally, a cloud-based system may also be employed to allow centralized storage of a digital template, and remote access to the digital template nearly immediately after digital template creation, even without pushing the digital template to one or more retail locations.

Some aspects contemplate retail locations in which a consumer may interact with one or more employees. An employee of the retail location may identify the consumer's electronic device, find a suitable digital template, and thereafter send the digital template (or instructions corresponding to the digital template) to an electronic production machine for on-demand production of the desired accessory. A consumer could potentially produce his or her own accessory if the proper equipment and authorization was obtained from the provider. In still another embodiment, an automated system may be provided to allow on-demand, real-time creation of an accessory, potentially without including interaction between a consumer and an employee of a retail center, and without a consumer purchasing particular equipment.

Figure 20:
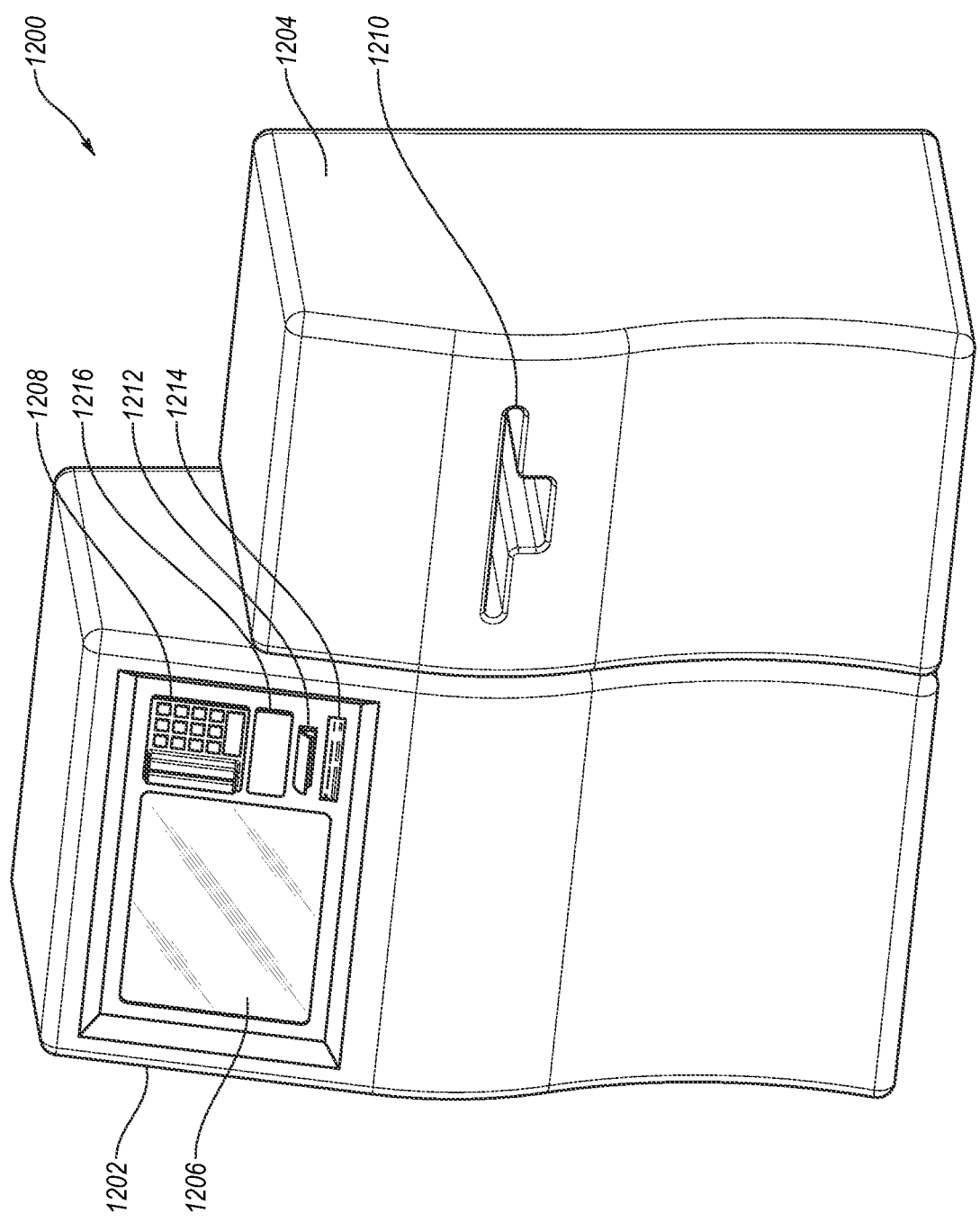
FIG. 20 illustrates an example self-serve kiosk usable in connection with embodiments of the present disclosure for provision and/or production of accessories for electronic devices.

More particularly, FIG. 20 illustrates an example self-serve kiosk 1200 that may be used in accordance with some embodiments of the present disclosure. The kiosk 1200 may be usable in connection with any number of different embodiments disclosed herein. For instance, in one embodiment, the kiosk 1200 is provided with access to a variety of digital templates that may be used in producing an accessory for an electronic device. Such digital templates may be pushed or otherwise provided and stored on the kiosk 1200, the digital templates may be accessible over a network connection, or they may be accessible in any number of other manners.

In the particular embodiment illustrated in FIG. 20, the kiosk 1200 includes a user interface component 1202 and a production component 1204. In general, the user interface component 1202 may provide devices or features to allow a user to interact with the kiosk 1200 to produce, search for, and/or retrieve a digital template, or identify a particular accessory corresponding to a digital template. In this particular embodiment, the kiosk 1200 includes a display device 1206. The display device 1206 optionally includes a touch screen that can receive input from a user. One or more views may therefore be displayed on the display device 1206 and by touching the display device 1206, selections or other input can be provided to allow a user to scroll through a list of digital templates or accessories, search for a digital template or accessory, or the like. The display device 1206 may include pressure, capacitive, or other touch-screen capabilities. Additionally, a single input, multiple-inputs, gestures, or other types of inputs may be recognizable using the display device 1206. In some embodiments, other input devices may also or alternatively be provided. For instance, a keyboard, mouse, trackball, scanner, or the like may be provided and used in lieu of, or in addition to, the display device 1206. Using any such input device, once a desired accessory or digital template is identified, the user can make a selection.

The kiosk 1200 may be capable of being used to both select an accessory for production, and for requesting production of the accessory. As noted herein, the display device 1206 or other input mechanisms can be used to select and potentially customize an accessory. Once selected, the production component 1204 may be used to produce the accessory. In this particular embodiment, the production component 1204 may include an enclosed portion housing one or more electronic production machines. Example machines may include printers, cutters, embossers, bonding machines, and the like, any or all of which may be used in the production of certain accessories for electronic devices. Once produced, the accessory can be supplied via a receptacle 1210, which is here shown as a slot, for retrieval by the consumer.

The kiosk 1200 may also include still other components to facilitate use. For instance, FIG. 20 illustrates an example in which the user interface component 1202 may include payment or other components. In this particular example, a bill acceptor 1212 for receiving currency may be provided. Upon selecting a particular product, a consumer may insert the necessary payment using the bill acceptor 1212, and any change may be returned (e.g., through receptacle 1210). Additionally payment options may be provided in the form of a credit card reader 1208 or NFC reader 1216. The NFC reader 1216 may be used with an electronic device, credit card, or other device equipped with near field communication capabilities.

In some embodiments the NFC reader 1216 may provide additional or other uses. For instance, as discussed herein, a product may be customized. Such customization may include printing of specific graphics, text or fonts, or other customizations. In some embodiments, a consumer may provide custom graphics or components using the NFC reader 1216. By way of illustration, a card or device having NFC capabilities may be tapped against the NFC reader 1216. The card or device may have a picture file stored thereon, which file can then be retrieved using the NFC reader 1216. In other embodiments, custom data can be retrieved in other manners. For instance, a card reader 1214 may be provided to read data cards (e.g., SD cards, xD cards, MMC cards, MemoryStick cards, CF cards, etc.). A file stored on such a card may then be provided to the kiosk for use. In similar manners, a magnetic or optical disk drive, ports (e.g., USB ports), or other inputs may be used for retrieving custom data. In still another embodiment, the kiosk 1200 may have a unique address such that a file sent to a particular email address, SMS address, or the like, can be accessed and potentially used to customize a product.

Figure 21:
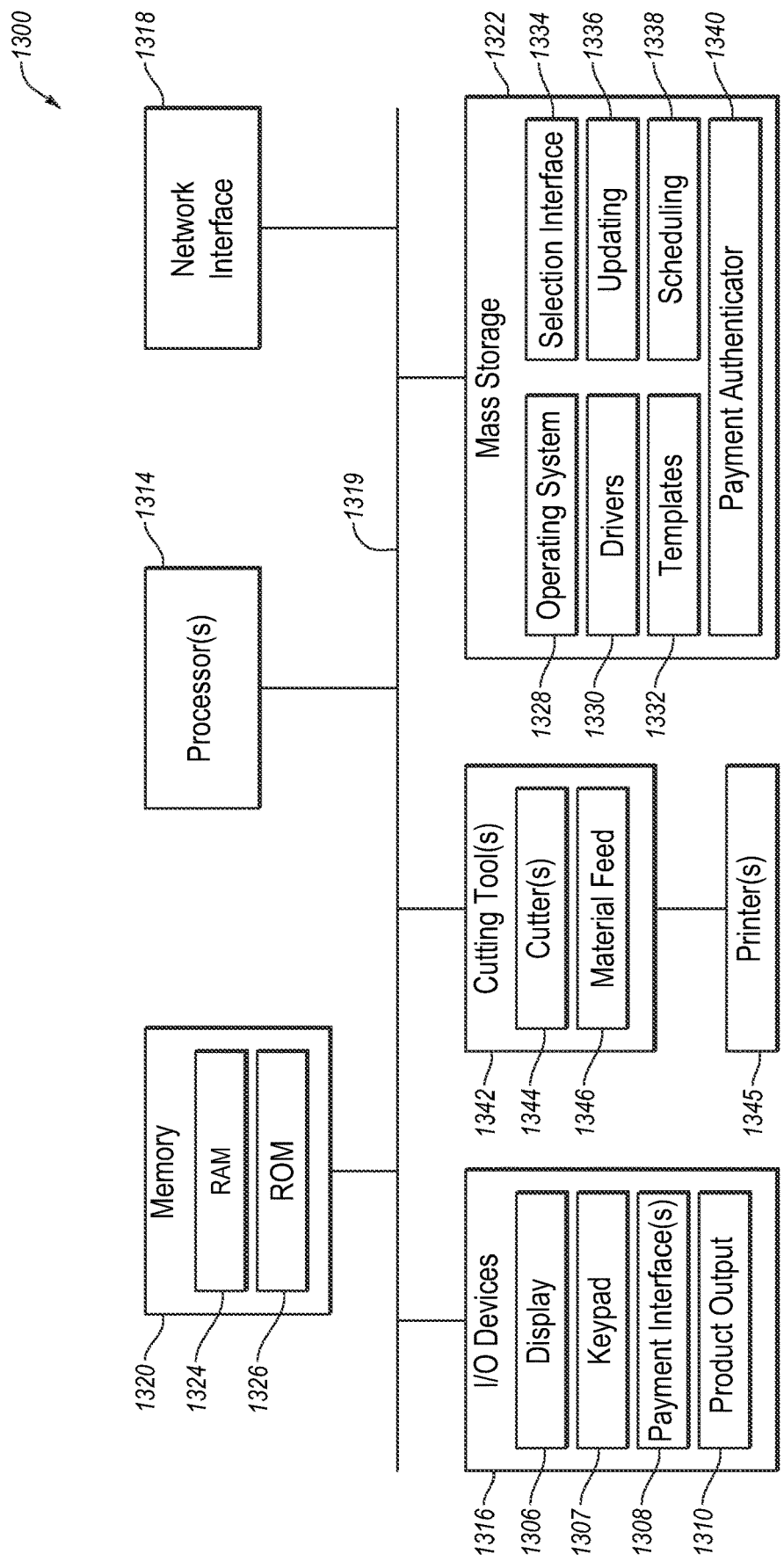
FIG. 21 schematically illustrates an example self-serve kiosk similar to the kiosk of FIG. 20, according to another embodiment of the present disclosure.

Turning now to FIG. 21, an example kiosk 1300 is schematically illustrated in additional detail. The illustrated kiosk 1300 may generally represent the kiosk 1200 of FIG. 20, or any number of other kiosks that may be used in connection with embodiments of the present disclosure.

As shown in FIG. 21, a kiosk 1300, which is optionally a self-serve kiosk, may include one or more processors 1314, various input/output devices 1316, and a network interface 1318. The processors 1314 may generally include one or more processing components, including a central processing unit, capable of executing computer-executable instructions received or stored by the kiosk 1300, including instructions received over a communication bus 1319 from the input/output devices 1316, the network interface 1318, or other components.

The input/output devices 1316 may include ports, keyboards, a mouse, scanners, printers, display elements, touch screens, other components, or any combination of the foregoing, at least some of which may provide input for processing by the processors 1314. For instance, this particular embodiment includes a display device 1306, a keypad 1307, one or more payment interfaces 1308 (e.g., bill acceptor, credit card reader, NFC reader, etc.), and a product output 1310. Of course, additional or other input/output devices 1316 may be provided, and some or all of the input/output devices 1316 may communicate with the processors 1314. Similarly, a network interface 1318 may receive or transmit communications via a network, and received communications may be provided over the communication bus 1319 and processed by the processors 1314 or other components. In one embodiment, the network interface 1318 may be used to receive digital templates, artwork, or other information used by the kiosk 1300 for the on-demand production of accessories for electronic devices.

The kiosk 1300 may also include memory 1320 and mass storage 1322. In general, the memory 1320 may include both persistent and non-persistent storage, and in the illustrated embodiment the memory 1320 is shown as including random access memory 1324 and read only memory 1326, although other types of memory or storage may also be included. The mass storage 1322 may generally include persistent storage in a number of different forms. Such forms may include a hard drive, flash-based storage, optical storage devices, magnetic storage devices, or other forms which are either permanently or removably coupled to the kiosk 1300. In some embodiments, an operating system 1328 defining the general operating functions of the kiosk 1300, and which is executed by the processors 1314 may be stored in the mass storage 1322. Other components stored in the mass storage 1322 may include drivers 1330 and digital templates 1332. The drivers 1330 may in some embodiments be used in communicating with input/output devices, production tools, and the like. The digital templates 1332 may include information about a design of a particular accessory and used by production tools to create the accessory. In FIG. 21, for instance, production tools may include cutting tools 1342. A cutting tool 1342 may include cutters 1344 for cutting materials provided by a material feed 1346. In one embodiment, materials may include a polymeric protective film supplied by the material feed 1346 and cut by the cutters 1344. Optionally, other components may also be provided. For instance, a printer 1345 may be provided. The printer 1345 can, in some embodiments, be used to print artwork, graphics, text, or other components on materials supplied by the material feed 1346, or otherwise use an additive manufacturing device or system.

The kiosk 1300 may also include other components and information. For instance, the mass storage 1322 may include information or applications to facilitate use of the kiosk 1300 in production of accessories for electronic devices. As an example, a selection interface application 1334 may be provided. Using the selection interface application 1334, one or more views may be provided to allow a user of the kiosk 1300 to select an accessory to be produced. Such views may also optionally provide other or additional features, including options to customize a product, select a previously produced product, or the like.

Other applications on the mass storage 1322 may include an updating module 1336. The updating module 1336 may be used in updating software or other information of the kiosk 1300, or to update a provider with information available at the kiosk 1300. For instance, as discussed herein, a kiosk 1300 may receive digital templates 1332 in any number of manners (e.g., from a provider system through the network interface 1318). In an example push-based system, the updating module 1336 may be used to receive new digital templates 1332 pushed to the kiosk 1300, store the digital templates 1332 in the digital template storage 104, 204 (FIGS. 1 and 2). and make such digital templates 1332 available for use by corresponding production tools (e.g., cutting tools 1342, printer 1345, etc.). Similarly, a request from a provider to delete or modify a digital template 1332 may be satisfied using the updating module 1336. Of course, production information, payment information, usage information, and the like may be created and stored by the kiosk 1300, and sent to a provider or centralized location. Such information may be aggregated, encrypted, of otherwise processed as directed by the updating module 1336, which can also use the network interface 1318 to send the information.

A scheduling module 1338 may also be provided for use by the kiosk 1300. The scheduling module 1338 may provide any number of features, including scheduling of production of one or more accessories using the cutting tools 1342 or other production tools or elements, or the scheduling of updates or payments to or from the kiosk 1300. A payment authentication module 1340 may also be provided to allow payment information received by the kiosk 1300 (e.g., at the payment interfaces 1308) to be verified. In one example, credit card information, bank account information, or other payment information received at the payment interfaces 1308 can be verified. The payment authentication module 1340 may use the network interface 1318 to communicate with a remote bank, credit card company, or the like to verify funds and/or to send a debit notice.

To avoid any ambiguity, the kiosks 1200 and 1300 need not operate in any specific manner, and may be used in connection with various types of systems, including systems discussed herein. For instance, the kiosks 1200 and 1300 may be used in connection with a centralized or other provider system that grants access to digital templates. Such access may be provided using a push model, a request/pull model, a cloud-based model, or some other model, or some combination thereof. Further, such updating may occur over a network that allows near real-time updating of the kiosks 1200 and 1300 when a new digital template is available or requested.

Additionally, while the kiosks 1200 and 1300 are described as being self-serve kiosks with which consumers may interact directly, the kiosks 1200 and 1300 may be used in connection with a retail location managed by one or more employees or the like. For instance, an employee at a retail location may enter information into the kiosks 1200 and 1300 to produce a product. Optionally, the employee may provide security credentials that can be verified. Such security credentials, information about the employee or retail location, information about the produced products, and the like can be stored as historical information that may also be sent or otherwise provided to other locations, including a centralized database or to a provider system.

In at least one embodiment, the kiosks 1200 and 1300 may be used by a consumer or employee located near the kiosks 1200 and 1300. In other embodiments, however, remote requests may be sent to the kiosks 1200 and 1300. As an example, a consumer may use a browser or application on a computing device, including potentially an electronic device for which an accessory is intended, to design and request the accessory to be made by an electronic production machine. Regardless of the location of the consumer, the consumer may then request production at a particular location. Such a location may include the location of the kiosk 1200 or 1300. The consumer may then go to such a location and pick-up the previously ordered product. In some embodiments, the consumer may specify a date and/or time for production or pick-up, in which case the scheduling module 1338 may be used to produce the accessory at a time later than when requested. In some embodiments, input devices may be used to verify the consumer when the consumer arrives at the kiosk 1200 or 1300. For instance, credit card information may be scanned to ensure it matches that provided for earlier payment, a confirmation code or receipt number may be entered, and the like. Upon verifying the consumer, a previously produced product may be delivered to the consumer via the product output 1310, or the product may then be created in real-time.

FIGS. 22-26 illustrate example interfaces that may be provided to select a particular accessory for production. In one embodiment, the interfaces may be used on a self-serve kiosk (e.g., kiosks 1200 and 1300); however, in other embodiments the interfaces may be used at virtually any other computing device, whether or not local or remote relative to an electronic production machine.

Figure 22:
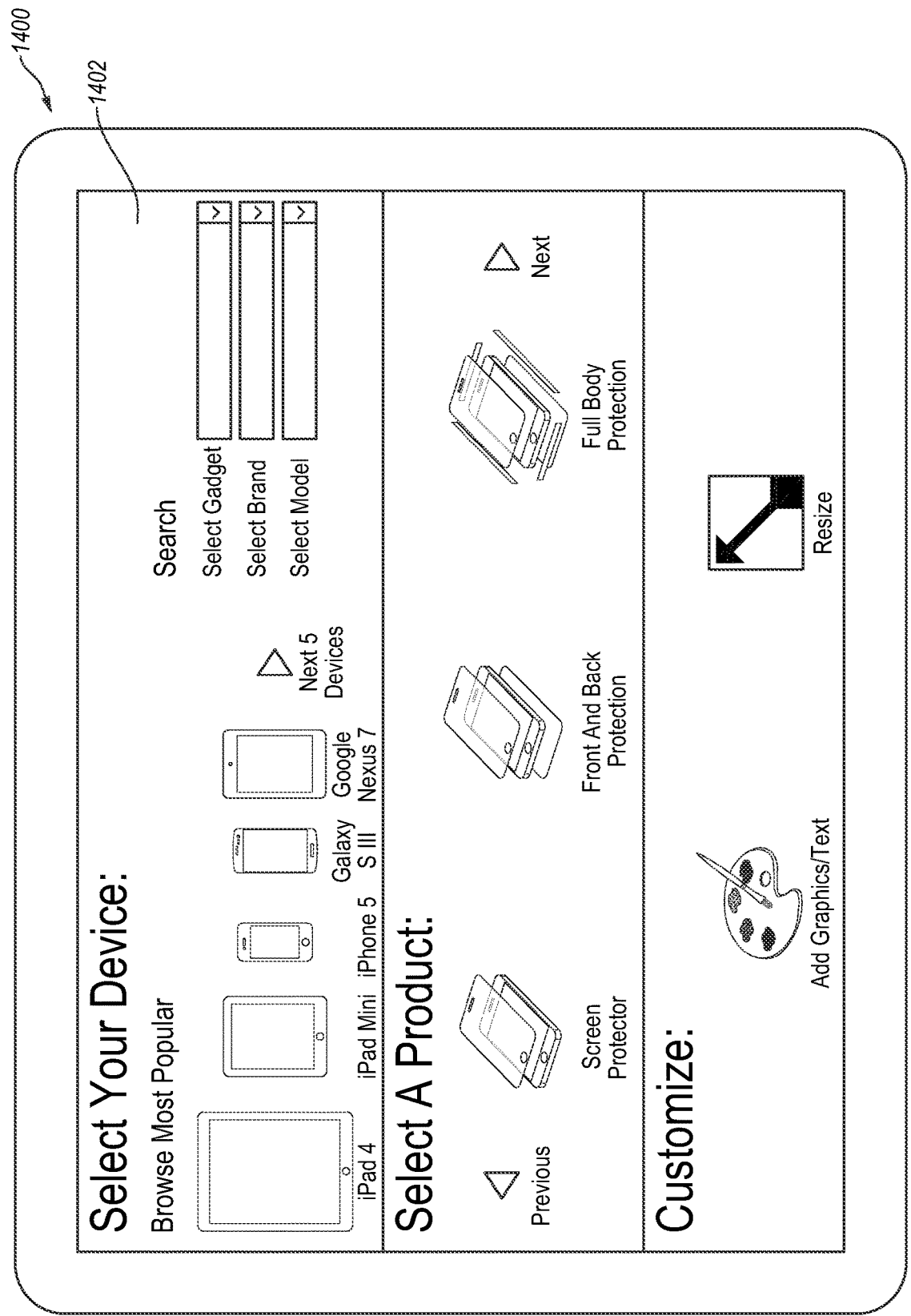

FIG. 22 specifically illustrates a display device 1400 that includes an interface having a view 1402 for selecting an accessory for production using systems, methods, and devices of the present disclosure. More particularly, the illustrated embodiment depicts the interface view 1402 as including one or more options for selecting or customizing an accessory, and which may correspond to an available digital template. For instance, in FIG. 22, the user may select a particular type of electronic device (e.g., by popularity, by type, by brand, by model, etc.) and a particular accessory type (e.g., screen protector, front and rear protection film, full-body protection, bumper, folio, etc.). Using such information, a particular digital template can be identified as discussed herein. Optionally, the user is given the ability to customize the digital template in some manner. For instance, the digital template may be modified to include graphics, text, or other embellishments. Other customizations, such as resizing of one or more portions of the digital template, may also be performed.

Figure 23:
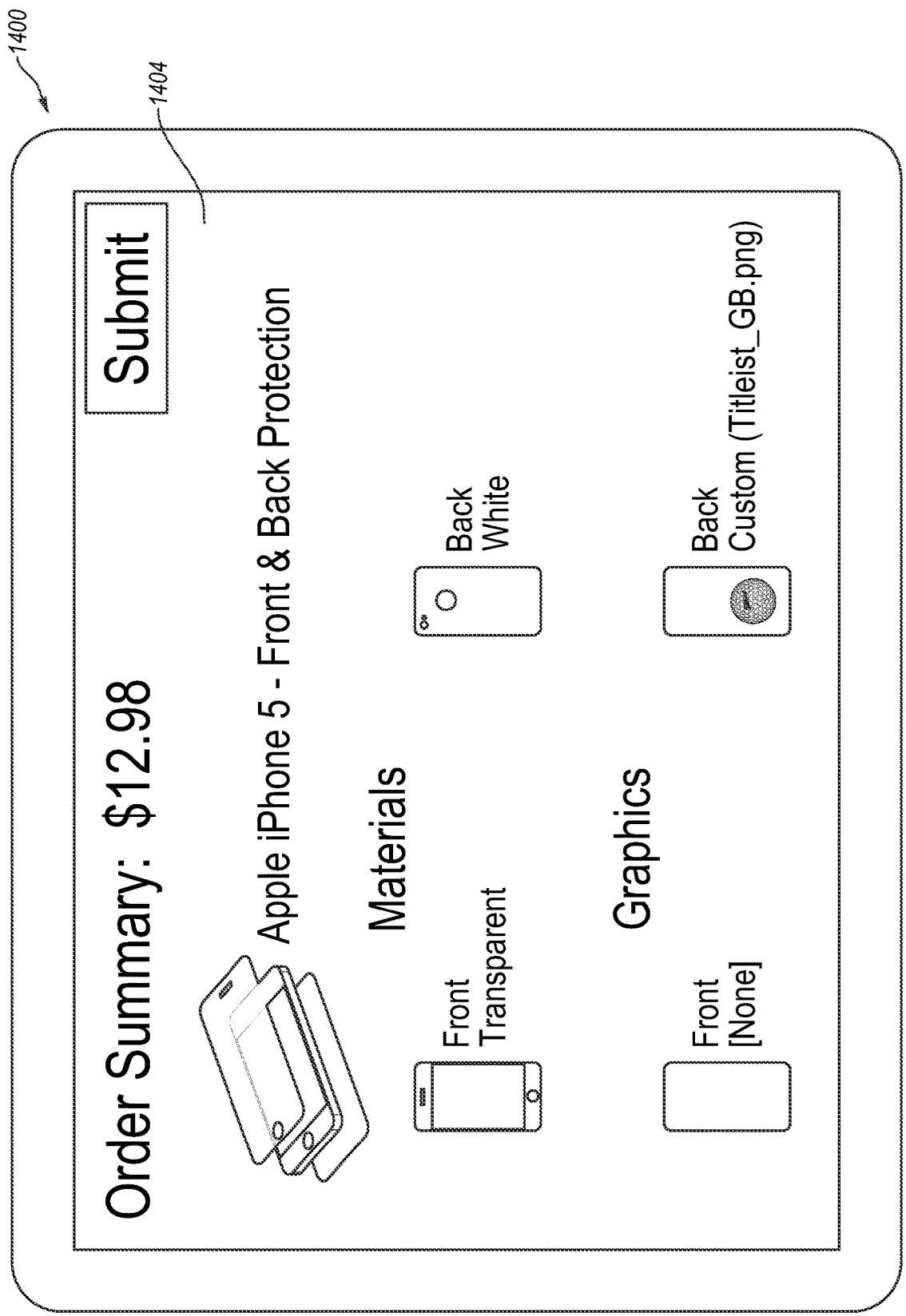

Upon identifying and potentially customizing the digital template, an accessory can be selected for production. As shown in FIG. 23, the display device 1400 may also display an interface that includes an order summary view 1404. In this particular embodiment, the order summary view 1404 may provide information to the user to show which electronic device and/or type of accessory has been selected, what materials will be used in producing the accessory, what graphics or other customizations are being requested, and the like. For instance, this particular order may include protective films for front and rear surfaces of a portable electronic device. A front protective film may be generally transparent and include no graphics or other customizations, while a rear protective film may be opaque or have a color (e.g., white) and include one or more graphics printed thereon.

Figure 24:
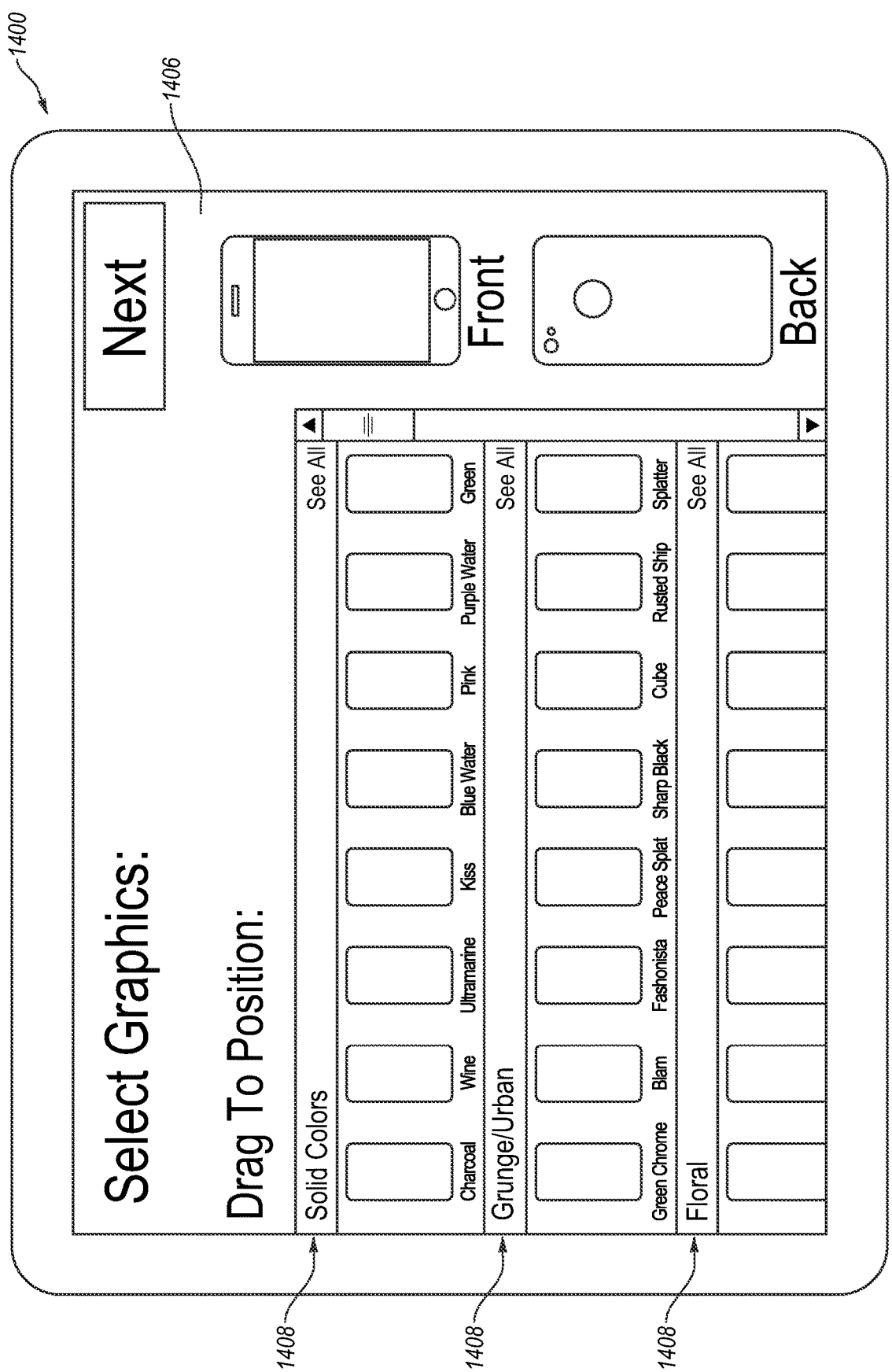
Figure 25:
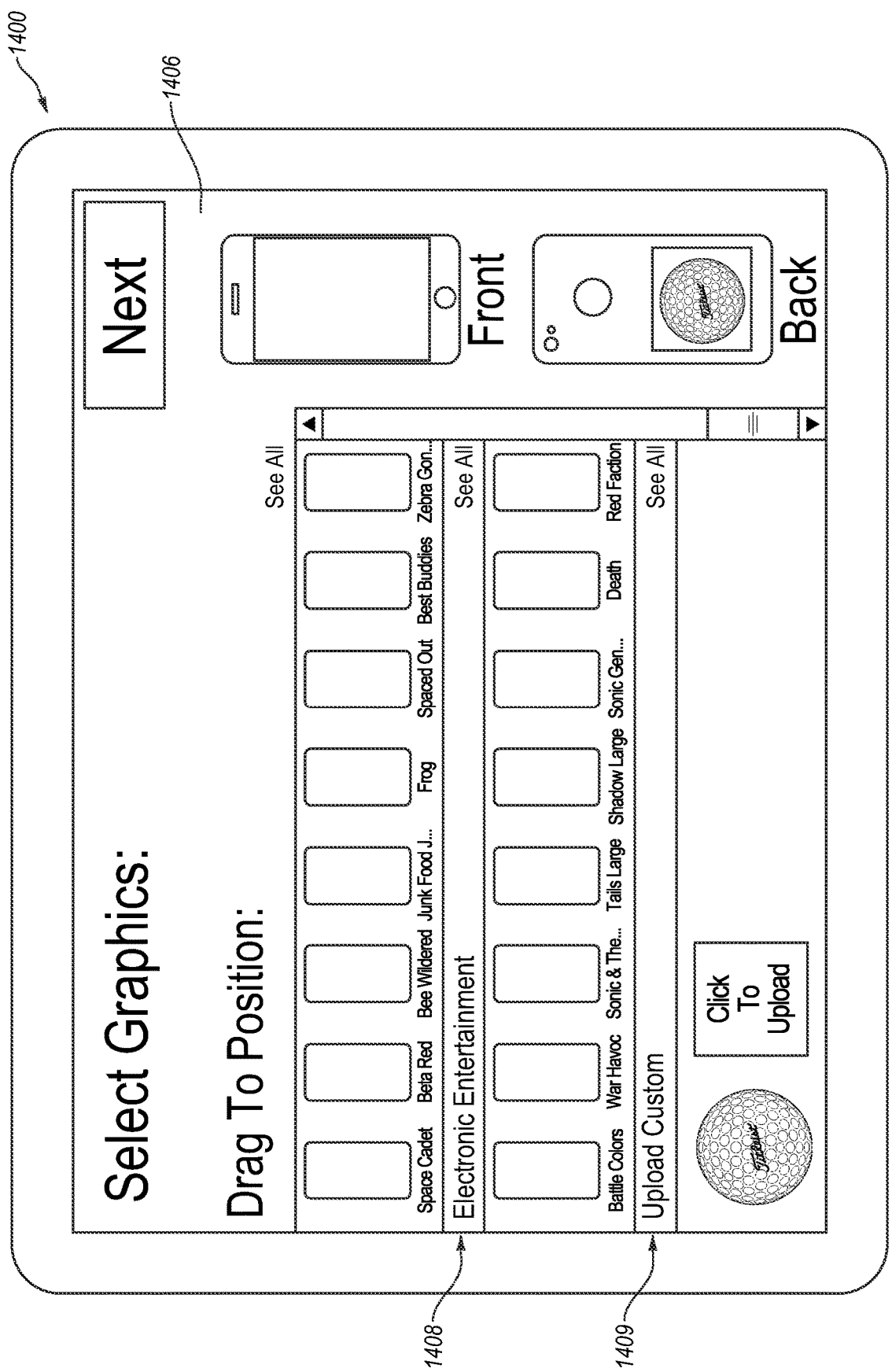

The particular manner of selecting the product and/or customizing the corresponding digital template can be varied in myriad ways. FIGS. 24 and 25 illustrate, by way of example only, some example views 1406, 1408 of an interface that may be displayed on the display device 1400 to select and customize graphics to be included on an accessory for an electronic device. Of course, similar views or processes may be used to select text, production materials, types of accessories, or other design features, or some combination thereof.

More specifically, FIG. 24 illustrates an example embodiment in which a digital template design, or device, may be shown in the view 1406. Also displayed are various optional categories of graphics that may be added to a to-be-produced accessory. The user may scroll through or otherwise view the various categories of graphics and/or expand options to view all options within a particular category.

An option may also be provided to provide custom graphics. In this particular embodiment, a custom category 1409 may be included. The custom category 1409 can then display specific graphics or other options provided by the user. As discussed herein, the graphics or other customizations can be provided in numerous ways, including by upload through memory devices, e-mail or SMS messaging, near-field communications, and the like.

For the particular embodiment shown in FIG. 25, the user may have requested a golf ball be uploaded, after which the golf ball can be shown on the view 1406 of the display device 1400. Optionally, the user can position the custom graphics on the display device 1400, which position can correspond to where such graphics will be located in a digital template and ultimately produced on an accessory. As further shown in FIG. 25, for instance, the user could touch and drag the golf ball to a desired location (e.g., the rear surface) and then select the particular location, size of the graphic, and the like. Of course, selecting, positioning, resizing, or otherwise customizing an accessory with stock or custom graphics or choices can be performed in any number of manners (e.g., selecting among pre-determined locations or sizes, resizing using gestures or multiple-touch interfaces, etc.).

When the user is satisfied with the design of the accessory, the user can submit the order (see view 1402 of FIG. 23). Payment information may also be provided or input as shown in FIG. 26. In this particular embodiment, payment information may be provided in a view 1410 that optionally provides the name, address, and other payment information corresponding to the requested accessory. Optionally, information about the time to produce or pick-up the accessory may also be provided. For instance, this embodiment illustrates an example in which a protective cover has been ordered and is being produced on-demand.

Figure 27:
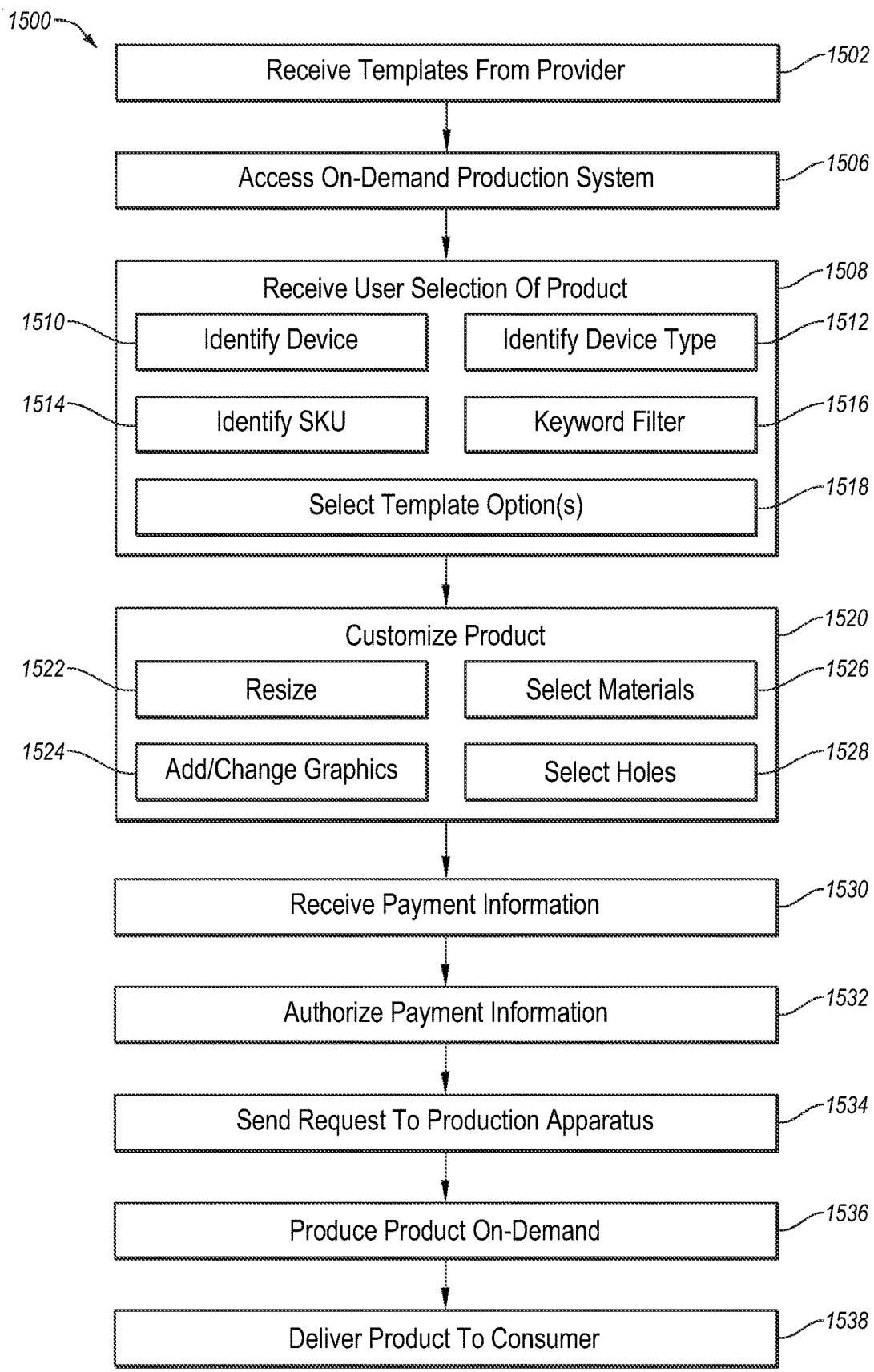
FIG. 27 illustrates an example method for using an on-demand production system for use in selecting and producing an accessory for an electronic device, according to some embodiments of the present disclosure.

An example of a method 1500 that may be used with a kiosk or other production request system, or with the interface views of FIGS. 23-26, is shown in greater detail in FIG. 27. In various regards, the method 1500 may be similar to the methods previously described herein, and thus incorporates the discussion of such methods. Optional additional or other acts or steps may be performed in accordance with some aspects of the present disclosure.

FIG. 27 specifically illustrates a method 1500 for producing an accessory for an electronic device based on a digital template. As part of the method 1500, one or more digital templates may be received from a provider (act 1502). As discussed herein, such digital templates may be received in any number of manners. In one embodiment, for instance, a digital template may be pushed to the recipient. As an example, upon release of a new electronic device to the public, digital templates for different accessories corresponding to that device may be created. Those digital templates may then be automatically pushed to a kiosk or other electronic production machine so that new accessories can be produced in near real-time with the creation of the digital template and/or release of the new electronic device. Of course, digital templates for previously available devices, modifications to digital templates, and the like can also be pushed to an electronic production machine. Alternatively, digital templates may be available on demand upon request or through a cloud-based access system.

Regardless of the manner in which a digital template is received or accessed, an on-demand production system may be accessed (act 1506). This may include use of a self-serve kiosk by a consumer who uses a user interface at the kiosk or a browser or application on a separate computing device. An employee of a retail location may also use a kiosk, or may use another computing device to access the on-demand production system in act 1506.

Using the production system, selection of an accessory or other product may be received in step 1508. Such selection may include selection by identifying a device, product category, or the like. For instance, if an accessory for an electronic device is to be produced, the user may identify the electronic device for which it will be used (act 1510) and/or the type of electronic device (act 1512). Additionally, or alternatively, a SKU of the electronic device or a particular digital template may be identified (act 1514). Filtering or other options may also be used, including filtering by a keyword in act 1516. Any or all of such options may be used to identify a digital template to use in producing a requested accessory. Optionally, one or more digital template options may also be selected in act 1518. Such options may include selection of a product style (e.g., a protective film, a folio, a bumper, etc.), sub-style (e.g., edge protection, display surface protection, full body surface protection, decorative skin, etc.), or some other option or style.

Further customizations may also be identified in step 1520. As examples, a digital template (and by correlation a product produced from a digital template) may be resized (act 1522). Graphics, text or other embellishments may also be selected, added, modified, moved, re-sized, or otherwise changed in act 1524. Where different composition, sizes, colors, or other types of materials are available, a material may also be selected in act 1526. Optionally, openings or holes may also be available (e.g., to display a logo, to keep a lens accessible, etc.), and which holes or openings should be included may also be selected (act 1528).

Payment information may also be received in act 1530. Such payment information can be received at any time, although the method 1500 shows receipt of such information following selection and customization of the to-be-produced accessory. Upon receipt of such payment, a payment may be authorized in act 1532 and a request can be sent in act 1534 to begin production of the requested accessory. One or more electronic production machines or elements may then be used to produce the accessory on-demand in act 1536, and upon completion the accessory can be delivered to the consumer in act 1538.

The discussion herein refers to a number of methods and method steps and acts that may be performed. It should be noted, that although the various methods, including their respective method steps and acts, may be discussed in a certain order or illustrated in a flow chart as occurring in a particular order, no particular ordering is necessarily required unless specifically stated, or required because an act is dependent on another act being completed prior to the act being performed.

Embodiments of the present disclosure may comprise or utilize a special purpose or general-purpose computer including computer hardware, such as, for example, one or more processors and system memory, as discussed in greater detail herein. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media.

Examples of computer storage media include RAM, ROM, EEPROM, CD-ROM or other optical disk storage, magnetic disk storage or other magnetic storage devices, or any other non-transmission medium which can be used to store desired program code means in the form of computer-executable instructions or data structures and which can be accessed by a general purpose or special purpose computer.

A "communication network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmissions media can include a communication network and/or data links, carrier waves, wireless signals, and the like, which can be used to carry desired program or digital template code means or instructions in the form of computer-executable instructions or data structures and which can be accessed by a general purpose or special purpose computer. Combinations of physical storage media and transmission media should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable electronic production machines, multi-processor systems, microprocessor-based or programmable consumer electronics, network PCs, minicomputers, mainframe computers, mobile telephones, PDAs, pagers, servers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose or other computing devices integrated within or coupled to electronic cutting machines, whether by a network connection, wireless connection, or hardwire connection. Example electronic production machines may include machines capable of cutting, creasing, perforating, or slotting film materials to form protective films shaped to correspond to particular electronic devices, performing 3D printing of an accessory using a plastic, composite, or metal material, screen printing or otherwise printing two-dimensional designs on a material, and the like. Example electronic production machines suitable for use with embodiments of the present disclosure may also directly, or indirectly, execute program code that enables the electronic production machine to accept inputs for selecting a digital template, digital templates pushed or transmitted from a remote store or source, and to design a customized digital template for an accessory based on the input. Such input may be provided manually or, as described herein, may be provided by provider system that, for example, automatically transfers a digital template upon creation or automatically transmits production instructions upon selection of a digital template. In some embodiments, the provider system, a server and/or a data store may also be incorporated within an electronic production system that forms accessories on-demand, and potentially based on user customizations, using digital templates, while in other embodiments one or more components are separate therefrom. The receiving system, a data store and the like may also be incorporated within an electronic production machine or system that cuts or otherwise forms on-demand accessories based on digital templates.

Although the foregoing description contains many specifics, these should not be construed as limiting the scope of the disclosed subject matter or of any of the appended claims, but merely as providing information pertinent to some specific embodiments that may fall within the scopes of the appended claims. Various embodiments are described, some of which incorporate differing features. The features illustrated or described relative to one embodiment are interchangeable and/or may be employed in combination with features of any other embodiment herein. In addition, other embodiments are envisioned and may also be devised which lie within the scopes of the disclosed subject matter and the appended claims. The scope of each claim is, therefore, indicated and limited only by its plain language and the legal equivalents to the subject matter recited by that claim. All additions, deletions, and modifications to the disclosed subject matter, that fall within the meaning and scopes of the claims, are to be embraced by the claims.

What is claimed:

1. A method for on-demand creation of a protective film, comprising:
    prior to or within a day of a product launch date of a particular electronic device, a provider:
        creating a digital cutting template for the particular electronic device;
        storing the digital cutting template as computer-executable instructions in a database of existing digital templates along with information related to the digital cutting template and the particular electronic device on a provider server; and
        making the digital cutting template immediately available from the provider server to a plurality of different retail stores remote from the provider server, each retail store of the plurality of different retail stores having an electronic production machine; and at a retail store of the plurality of different retail stores, receiving the digital cutting template from the provider server;

while a customer remains at the retail store and waits for the protective film:

receiving an order for a protective film for the particular electronic device from the customer at the retail store;

introducing a sheet of stock material from a supply of stock materials from the provider into a feed system of an electronic cutting machine;

using the electronic production machine to produce the protective film as defined by the digital cutting template from the sheet of stock material; and providing the protective film to the customer.

2. The method of claim 1, wherein introducing the sheet of stock material comprises introducing a sheet of stock material from a supply of stock materials from the provider, the supply of stock materials including a plurality of different sizes of sheets of stock material, each sheet of stock material of the supply of stock materials comprising a plurality of layers, including a transparent protective layer, an adhesive on a surface of the transparent protective layer, and a removable backing layer positioned over the transparent protective layer and secured to the adhesive.

3. The method of claim 1, wherein receiving the digital cutting template includes receiving the digital cutting template immediately after receiving the order and based on information received from the retail store.

4. The method of claim 1, wherein receiving the digital cutting template includes receiving the digital cutting template with cloud-based or local storage.

5. The method of claim 1, wherein the particular electronic device is a newly released electronic device, and the digital cutting template is received within one day of release of the particular electronic device.

6. The method of claim 1, further comprising:
storing the digital cutting template in memory associated with the electronic production machine.

7. The method of claim 6, wherein storing the digital cutting template includes storing the digital cutting template on a storage device on the electronic production machine.

8. The method of claim 1, wherein the electronic production machine is located at the retail store.

9. The method of claim 1, wherein the digital cutting template is received by the electronic production machine.

10. The method of claim 1, wherein the digital cutting template is received by a computing device connected to the electronic production machine.

11. The method of claim 1, wherein receiving the digital cutting template comprises receiving the digital cutting template at a kiosk, and wherein using the electronic production machine comprises using an electronic production machine of the kiosk.

12. The method of claim 11, wherein the kiosk is a self-serve kiosk.

13. The method of claim 1, wherein receiving the order comprises receiving information including one or more of:
a date the protective film was produced;
a time the protective film was produced;
a location where the protective film was produced; or
who requested production of the protective film by the electronic production machine.

14. The method of claim 1, wherein receiving the digital cutting template comprises receiving an encrypted digital cutting template, and the method further includes:
decrypting the encrypted digital cutting template prior to use of the digital cutting template by the electronic production machine.

15. The method of claim 1, wherein using the electronic production machine to produce the protective film as defined by the digital cutting template includes:
cutting the protective film from the sheet of stock material and in a shape defined by the digital cutting template.

16. The method of claim 1, wherein a time between requesting production of the protective film and completion of producing the protective film is less than one hour.

17. An electronic production system, comprising:
a provider, including:
a provider system on which a digital cutting template for a protective film for a particular electronic device is developed prior to or within a day of a product launch date of the particular electronic device;
digital template storage, in communication with the provider system, storing the digital cutting template alongside information related to the digital cutting template and the particular electronic device and making the digital cutting template immediately available from the provider system to a plurality of different retail stores located remotely from the provider within a day of the product launch date;
an electronic communication network;
a supply of stock materials from the provider;
an on-demand cutter from the provider at a retail store of the plurality of different retail stores, in communication with the digital template storage by way of the electronic communication network, and including:
one or more production elements;
a feed system that feeds a sheet of stock material of the supply of stock materials through at least a portion of a housing of the on-demand cutter and to the one or more production elements;
a network interface for receiving the digital cutting templates for the protective film from the digital template storage of the provider over the electronic communication network;
a processing component that:
receives an order for a customer for the protective film for the particular electronic device from the retail store where the housing, the one or more production elements and/or the feed system are located; and
uses the digital cutting template to cause the one or more production elements to cut the sheet of stock material specific to the particular electronic device immediately upon receipt of the order from the customer to define the protective film from the sheet of stock material, while the customer waits at the retail store from which the order was placed and at which the protective film will be cut.

18. The electronic production system of claim 17, wherein the network interface is embedded within the housing.

19. The electronic production system of claim 17, wherein the supply of stock materials includes a plurality of different sizes of sheets of stock material, each sheet of stock material of the supply of stock materials comprising a plurality of layers, including a transparent protective layer, an adhesive on a surface of the transparent protective layer, and a removable backing layer positioned over the transparent protective layer and secured to the adhesive.

20. The electronic production system of claim 17, wherein the one or more production elements includes a printer for printing graphics, text or other embellishments on the supply of stock materials.

* * * * *